United States Patent
Zhou et al.

(10) Patent No.: US 12,260,622 B2
(45) Date of Patent: Mar. 25, 2025

(54) SYSTEMS, METHODS, AND APPARATUSES FOR THE GENERATION OF SOURCE MODELS FOR TRANSFER LEARNING TO APPLICATION SPECIFIC MODELS USED IN THE PROCESSING OF MEDICAL IMAGING

(71) Applicant: Arizona Board of Regents on behalf of Arizona State University, Scottsdale, AZ (US)

(72) Inventors: Zongwei Zhou, Tempe, AZ (US); Vatsal Sodha, San Jose, CA (US); Md Mahfuzur Rahman Siddiquee, Tempe, AZ (US); Ruibin Feng, Scottsdale, AZ (US); Nima Tajbakhsh, Los Angeles, CA (US); Jianming Liang, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 372 days.

(21) Appl. No.: 17/625,313

(22) PCT Filed: Jul. 17, 2020

(86) PCT No.: PCT/US2020/042560
§ 371 (c)(1),
(2) Date: Jan. 6, 2022

(87) PCT Pub. No.: WO2021/016087
PCT Pub. Date: Jan. 28, 2021

(65) Prior Publication Data
US 2022/0262105 A1 Aug. 18, 2022

Related U.S. Application Data

(60) Provisional application No. 62/876,502, filed on Jul. 19, 2019.

(51) Int. Cl.
*G06V 10/82* (2022.01)
*G06V 10/774* (2022.01)
(Continued)

(52) U.S. Cl.
CPC ........ *G06V 10/7747* (2022.01); *G06V 10/776* (2022.01); *G06V 10/82* (2022.01); *G06V 10/98* (2022.01); *G06V 2201/03* (2022.01)

(58) Field of Classification Search
CPC .. G06V 10/7747; G06V 10/776; G06V 10/82; G06V 10/98; G06V 2201/03; G06N 3/045; G06N 3/088
(Continued)

(56) References Cited

U.S. PATENT DOCUMENTS

2016/0110632 A1* 4/2016 Kiraly .................. G06T 7/11 382/128
2018/0114317 A1* 4/2018 Song ................ G06F 18/24155
(Continued)

FOREIGN PATENT DOCUMENTS

WO 2021016087 A1 1/2021

OTHER PUBLICATIONS

Mortenson, M.E., "Mathematics for computer graphics applications," Industrial Press Inc., 1999.
(Continued)

Primary Examiner — Stephen P Coleman
(74) Attorney, Agent, or Firm — Elliott, Ostrander & Preston, P.C.

(57) ABSTRACT

Described herein are means for generating source models for transfer learning to application specific models used in the processing of medical imaging. In some embodiments, the method comprises: identifying a group of training samples, wherein each training sample in the group of training samples includes an image; for each training sample in the
(Continued)

group of training samples: identifying an original patch of the image corresponding to the training sample; identifying one or more transformations to be applied to the original patch; generating a transformed patch by applying the one or more transformations to the identified patch; and training an encoder-decoder network using a group of transformed patches corresponding to the group of training samples, wherein the encoder-decoder network is trained to generate an approximation of the original patch from a corresponding transformed patch, and wherein the encoder-decoder network is trained to minimize a loss function that indicates a difference between the generated approximation of the original patch and the original patch. The source models significantly enhance the transfer learning performance for many medical imaging tasks including, but not limited to, disease/organ detection, classification, and segmentation. Other related embodiments are disclosed.

21 Claims, 13 Drawing Sheets

(51) Int. Cl.
G06V 10/776 (2022.01)
G06V 10/98 (2022.01)

(58) Field of Classification Search
USPC .......................................................... 382/157
See application file for complete search history.

(56) References Cited

U.S. PATENT DOCUMENTS

2021/0326653 A1 10/2021 Zhou et al.
2021/0342646 A1 11/2021 Feng et al.
2021/0343014 A1 11/2021 Haghighi et al.

OTHER PUBLICATIONS

Mundhenk, T. N. et al., "Improvements to Context Based Self-Supervised Learning." 2018 IEEE/CVF Conference on Computer Vision and Pattern Recognition, 2018, pp. 9339-9348, https://doi.org/10.1109/CVPR.2018.00973.
National Lung Screening Trial Research Team, "Reduced Lung-Cancer Mortality with Low-Dose Computed Tomographic Screening," New England Journal of Medicine, vol. 365, No. 5, 2011, pp. 395-409.
Noroozi, M. et al., "Unsupervised Learning of Visual Representations by Solving Jigsaw Puzzles," European Conference on Computer Vision, 2016, Springer International Publishing, pp. 69-84.
Noroozi, M., et al, "Boosting Self-Supervised Learning via Knowledge Transfer," Proceedings of the IEEE Conference on Computer Vision and Pattern Recognition, 2018, pp. 9359-9367.
Pan, S. J. et al., "A Survey on Transfer Learning," IEEE Transactions on Knowledge and Data Engineering, vol. 22, No. 10, 2010, pp. 1345-1359.
Pathak, D. et al., "Context Encoders: Feature Learning by Inpainting," 2016 Proceedings of the IEEE Conference on Computer Vision and Pattern Recognition (CVPR), pp. 2536-2544, https://doi.org/10.1109/CVPR.2016.278.
Rawat, W. et al., "Deep Convolutional Neural Networks for Image Classification: A Comprehensive Review," Neural Computation, vol. 29, No. 9, 2017, pp. 2352-2449.
Ross, T. et al., "Exploiting the potential of unlabeled endoscopic video data with self-supervised learning," International Journal of Computer Assisted Radiology and Surgery 13, 2018, pp. 925-933.
Roth, H.R. et al., "A New 2.5D Representation for Lymph Node Detection using Random Sets of Deep Convolutional Neural Network Observations," in International Conference on Medical Image Computing and Computer-Assisted Intervention—MICCAI 2014: 17th International Conference, Boston, MA, USA, Sep. 14-18, 2014, Proceedings, Part I 17, 2014, Springer International Publishing, pp. 520-527.
Roth, H.R., et al., "Improving Computer-Aided Detection Using Convolutional Neural Networks and Random View Aggregation," IEEE Transactions on Medical Imaging, vol. 35, No. 5, May 2016, pp. 1170-1181.
Sayed, N., et al., "Cross and Learn: Cross-Modal Self-supervision," Pattern Recognition, GCPR 2018, Lecture Notes in Computer Science, vol. 11269, 2019, Springer International Publishing, pp. 228-243.
Setio, A.A.A. et al., "Pulmonary Nodule Detection in CT Images: False Positive Reduction Using Multi-View Convolutional Networks," IEEE Transactions on Medical Imaging vol. 35, No. 5, May 2016, pp. 1160-1169.
Setio, A.A.A. et al., "Validation, comparison, and combination of algorithms for automatic detection of pulmonary nodules in computed tomography images: The LUNA16 challenge," Medical Image Analysis, vol. 42, 2017, pp. 1-13.
Shen, D., et al, "Deep Learning in Medical Image Analysis," Annual Review of Biomedical Engineering, vol. 19, 2017, pp. 221-248.
Shin, H.C. et al., "Deep Convolutional Neural Networks for Computer-Aided Detection: CNN Architectures, Dataset Characteristics and Transfer Learning," IEEE Transactions on Medical Imaging, vol. 35, No. 5, 2016, pp. 1285-1298.
Spitzer, H. et al., "Improving Cytoarchitectonic Segmentation of Human Brain Areas with Self-supervised Siamese Networks," Medical Image Computing and Computer Assisted Intervention—MICCAI 2018: 21st International Conference, Granada, Spain, Sep. 16-20, 2018, Lecture Notes on Computer Science, vol. 11072, 2018, Springer International Publishing, pp. 663-671.
Sun, C. et al., "Revisiting Unreasonable Effectiveness of Data in Deep Learning Era," Proceedings of the IEEE International Conference on Computer Vision (ICCV), 2017, pp. 843-852.
Sun, W., et al, "Automatic feature learning using multichannel ROI based on deep structured algorithms for computerized lung cancer diagnosis," Computers in Biology and Medicine, vol. 89, 2017, pp. 530-539.
Tajbakhsh, N. et al., "Computer-aided detection and visualization of pulmonary embolism using a novel, compact, and discriminative image representation," Medical Image Analysis, vol. 58, 2019, Article 101541, 13 pages.
Tajbakhsh, N. et al., "Computer-Aided Pulmonary Embolism Detection Using a Novel Vessel-aligned Multi-planar Image Representation and Convolutional Neural Networks," Medical Image Computing and Computer-Assisted Intervention—MICCAI 2015: 18th International Conference, Munich, Germany, Oct. 5-9, 2015, Proceedings, Part II 18, 2015, Springer International Publishing, pp. 62-69.
Tajbakhsh, N. et al., "Convolutional Neural Networks for Medical Image Analysis: Full Training or Fine Tuning?," IEEE Transactions on Medical Imaging, vol. 35, No. 5, May 2016, pp. 1299-1312.
Tajbakhsh, N. et al., "Surrogate Supervision for Medical Image Analysis: Effective Deep Learning from Limited Quantities of Labeled Data," IEEE 16th International Symposium on Biomedical Imaging, Venice, Italy, 2019, pp. 1251-1255.
Tajbakhsh, N., et al., "Computer-aided detection and visualization of pulmonary embolism using a novel, compact and discriminative image representation," Medical Image Analysis, vol. 58, 2019, 101541, 15 pages.
Tang, H., et al., "NoduleNet: Decoupled False Positive Reduction for Pulmonary Nodule Detection and Segmentation," Medical Image Computing and Computer Assisted Intervention—MICCAI 2019: 22nd International Conference, Shenzhen, China, Oct. 13-17, 2019, Lecture Notes on Computer Science Vo. 11769, 2019, Springer International Publishing, pp. 266-274.
Tang, Y., et al., "Attention-Guided Curriculum Learning for Weakly Supervised Classification and Localization of Thoracic Diseases on Chest Radiographs," Machine Learning in Medical Imaging: 9th International Workshop, MLMI 2018, Held in Conjunction with

(56) References Cited

OTHER PUBLICATIONS

MICCAI 2018, Granada, Spain, Sep. 16, 2018, Lecture Notes on Computer Science, Fol. 11046, Springer International Publishing, pp. 249-258.
Vincent, P., et al., "Stacked Denoising Autoencoders: Learning Ueful Representations in a Deep Network with a Local Denoising Criterion," Journal of Machine Learning Research, vol. 11, No. 12, 2010, pp. 3371-3408.
Voulodimos, A., et al., "Deep Learning for Computer Vision: A Brief Review," Computational Intelligence and Neuroscience, vol. 2018, Article 7068349, 13 pages.
Wang, H. et al., "Comparison of machine learning methods for classifying mediastinal lymph node metastasis of non- small cell lung cancer from 18 F-FDG PET/CT images," EJNMMI research 7(1), 2017, pp. 1-11.
Wang, X. et al., "ChestX-ray8: Hospital-scale Chest X-ray Database and Benchmarks on Weakly-Supervised Classification and Localization of Common Thorax Diseases," Proceedings of the IEEE Conference on Computer Vision and Pattern Recognition, 2017, pp. 3462-3471.
Weiss, K., et al., "A survey of transfer learning," Journal of Big Data, vol. 3, Article No. 9, 2016, 40 pages.
Wu, B. et al., "Joint Learning for Pulmonary Nodule Segmentation, Attributes and Malignancy Prediction," In 2018 IEEE 15th International Symposium on Biomedical Imaging (ISBI 2018), 2018, pp. 1109-1113, IEEE.
Yosinski, J. et al., "How transferable are features in deep neural networks?" Advances in Neural Information Processing Systems, 27 (NIPS 2014), arXiv preprint arXiv:1411.1792.
Zhang, L. et al., "AET vs. AED: Unsupervised Representation Learning by Auto-Encoding Transformations Rather than Data," Proceedings of the IEEE/CVF Conference on Computer Vision and Pattern Recognition, 2019, pp. 2542-2550.
Zhang, R., et al, "Colorful Image Colorization," Computer Vision—ECCV 2016: 14th European Conference, Amsterdam, The Netherlands, Oct. 11-14, 2016, Proceedings, Part III, Lecture Notes on Computer Science vol. 9907, 2016, Springer International Publishing, pp. 649-666.
Zhang, R., et al, "Split-Brain Autoencoders: Unsupervised Learning by Cross-Channel Prediction," Proceedings of the IEEE Conference on Computer Vision and Pattern Recognition, 2017, pp. 645-654.
Zhang, T., et al, "Solving Large Scale Linear Prediction Problems Using Stochastic Gradient Descent Algorithms," Proceedings of the 21st International Conference on Machine Learning, 2004, 8 pages.
Zhou, Z. et al., "Fine-tuning Convolutional Neural Networks for Biomedical Image Analysis: Actively and Incrementally," In 30th IEEE Conference on Computer Vision and Pattern Recognition, CVPR 2017, pp. 4761-4772.
Zhou, Z. et al., "Models Genesis: Generic Autodidactic Models for 3D Medical Image Analysis," Medical Image Computing and Computer Assisted Intervention—MICCAI 2019: 22nd International Conference, Shenzhen, China, Oct. 13-17, 2019, Proceedings, Part IV 22, 2019, Springer International Publishing, pp. 384-393.
Zhou, Z., et al, "Integrating Active Learning and Transfer Learning for Carotid Intima-Media Thickness Video Interpretation," Journal of Digital Imaging, vol. 32, 2019, pp. 290-299.
Zhou, Z., et al, "Models Genesis," Medical Image Analysis, vol. 67, 2021, Article 101840, 23 pages.
Zhou, Z., et al, "UNet++: A Nested U-Net Architecture for Medical Image Segmentation," in Deep Learning in Medical Image Analysis and Multimodal Learning for Clinical Decision Support, 2018, pp. 3-11, Springer, Cham.
Zhuang, X. et al., "Self-supervised Feature Learning for 3d Medical Images by Playing a Rubik's Cube," Medical Image Computing and Computer Assisted Intervention—MICCAI 2019: 22nd International Conference, Shenzhen, China, Oct. 13-17, 2019, Proceedings, Part IV 22, 2019, Springer International Publishing, pp. 420-428.
Alex, V. et al., Semisupervised learning using denoising autoencoders for brain lesion detection and segmentation, Journal of Medical Imaging 4(4), 2017, pp. 041311-041311-16.

Ardila, D. et al., "End-to-end lung cancer screening with three-dimensional deep learning on low-dose chest computed tomography," Nature Medicine 25(6), 2019, pp. 954-961.
Aresta, G. et al., "iW-Net: an automatic and minimalistic interactive lung nodule segmentation deep network," Scientific Reports 9(1), 2019, 9 pages.
Armato III, S.G. et al., "The Lung Image Database Consortium (LIDC) and Image Database Resource Initiative (IDRI): A Completed Reference Database of Lung Nodules on CT Scans," Medical Physics 38(2), 2011, pp. 915-931.
Bakas, S. et al., "Identifying the Best Machine Learning Algorithms for Brain Tumor Segmentation, Progression Assessment, and Overall Survival Prediction in the BRATS Challenge," arXiv preprint arXiv:1811.02629, 2018, 28 pages.
Bilic, P. et al., "The Liver Tumor Segmentation Benchmark (LiTS)," Medical Image Analysis, 84, 102680, arXiv preprint arXiv:1901.04056, 2019.
Buzug, T.M., "Computed Tomography," Handbook of Medical Technology, 2011, Springer Berlin, Heidelberg, pp. 311-342.
Caron, M. et al., "Deep Clustering for Unsupervised Learning of Visual Features," In Proceedings of the European Conference on Computer Vision (ECCV), 2018, pp. 132-149.
Caron, M. et al., "Unsupervised Pre-Training of Image Features on Non-Curated Data," Proceedings of the IEEE International Conference on Computer Vision, 2019, pp. 2959-2968.
Carreira, J. et al., "Quo Vadis, Action Recognition? A New Model and the Kinetics Dataset," In 2017 IEEE Conference on Computer Vision and Pattern Recognition (CVPR), (Jul. 2017), pp. 6299-6308.
Chen, L. et al., "Self-supervised learning for medical image analysis using image context restoration," Medical Image Analysis, vol. 58, 2019, 12 pages, https://doi.org/10.1016/j.media.2019.101539.
Chen, S. et al., Med3D: Transfer Learning for 3d Medical Image Analysis. arXiv preprint arXiv:1904.00625, 2019, 12 pages.
Chen, T. et al., "Self-Supervised GANs via Auxiliary Rotation Loss," arXiv: 1811.11212v2 [cs.LG], 2019, 15 pages.
Deng, J. et al., "ImageNet: A Large-Scale Hierarchical Image Database," 2009 IEEE Conference on Computer Vision and Pattern Recognition, 2009, pp. 248-255.
Ding, Y. et al., "A Deep Learning Model to Predict a Diagnosis of Alzheimer Disease by Using 18F-FDG Pet of the Brain," Radiology, vol. 290, No. 2, 2019, pp. 456-464.
Doersch, C. et al., "Multi-task Self-Supervised Visual Learning," ARXIV:1708.07860v1: [cs:CV], 2017, 13 pages.
Doersch, C. et al., "Unsupervised Visual Representation Learning by Context Prediction," Proceedings of the IEEE International Conference on Computer Vision, 2015, pp. 1422-1430, https://doi.org/10.1109/ICCV.2015.167.
Esteva, A.,. et al., "Dermatologist-level classification of skin cancer with deep neural networks," Nature, vol. 542, 2017, pp. 115-118.
Feng, R., et al, "Self-supervised Learning: From Parts to Whole," unpublished manuscript, 12 pages.
Forbes, G.B., "Human Body Composition: Growth, Aging, Nutrition, and Activity," 2012, Springer Science & Business Media.
Gibson, E. et al., "NiftyNet: a deep-learning platform for medical imaging," Computer Methods and Programs in Biomedicine, vol. 158, 2018, pp. 113-122.
Gibson, E., et al., "Automatic Multi-Organ Segmentation on Abdominal CT with Dense V-Networks," IEEE Transactions on Medical Imaging, vol. 37, No. 8, 2018, pp. 1822-1834.
Glorot, X., et al., "Understanding the difficulty of training deep feed forward neural networks," International Conference on Artificial Intelligence and Statistics (2010), pp. 249-256.
Goyal, P. et al., "Scaling and Benchmarking Self-Supervised Visual Representation Learning," Proceedings of the IEEE/CVF International Conference on Computer Vision, 2019, pp. 6390-6399.
Greenspan, H. et al., "Guest Editorial Deep Learning in Medical Imaging: Overview and Future Promise of an Exciting New Technique", IEEE Transactions on Medical Imaging, vol. 35, No. 5, May 2016, pp. 1153-1159.
Guan, Q., et al, "Multi-label chest X-ray image classification via category-wise residual attention learning," Pattern Recognition Letters, 130, 2020, pp. 259-266.

(56) References Cited

OTHER PUBLICATIONS

Guendel, S., et al, "Learning to Recognize Abnormalities in Chest X-Rays with Location-Aware Dense Networks," arXiv: 1803.04565v1 [cs.CV], 2018, 9 pages.

Haghighi, F., et al, "Semantic Genesis," unpublished manuscript, 12 pages.

He, K. et al., "Deep Residual Learning for Image Recognition," Proceedings of the IEEE Conference on Computer Vision and Pattern Recognition, 2016, pp. 770-778.

He, K. et al., "Delving Deep into Rectifiers: Surpassing Human-Level Performance on ImageNet Classification," Proceedings of the IEEE Conference on Computer Vision and Pattern Recognition, 2015, pp. 1026-1034.

Hendrycks, D. et al., "Using Self-Supervised Learning Can Improve Model Robustness and Uncertainty," Advances in Neural Information Processing Systems, 32, 2019, 12 pages.

Huang, G. et al., "Densely Connected Convolutional Networks," Proceedings of the IEEE Conference on Computer Vision and Pattern Recognition, 2017, pp. 2261-2269.

Hurst, R.T. et al., "Incidence of Subclinical Atherosclerosis as a Marker of Cardiovascular Risk in Retired Professional Football Players," The American Journal of Cardiology, vol. 105, Issue 8, 2010, pp. 1107-1111.

Iizuka, S., et al., "Globally and Locally Consistent Image Completion," ACM Transactions on Graphics, vol. 36, No. 4, 2017, Article 107, pp. 107:2-107:14.

International Search Report and Written Opinion for International Patent Application No. PCT/US20/42560, dated Oct. 7, 2020, 21 pages.

Ioffe, S., et al, "Batch Normalization: Accelerating Deep Network Training by Reducing Internal Covariate Shift," Conference on Machine Learning, vol. 37, 2015, JMLR, pp. 448-456.

Irvin, J. et al. "CheXpert: A Large Chest Radiograph Dataset with Uncertainty Labels and Expert Comparison," Proceedings of the AAAI Conference on Artificial Intelligence, vol. 33, No. 01, 2019, pp. 590-597.

Jamaludin, A., et al, "Self-Supervised Learning for Spinal MRIs," arXiv:1708.00367v1 [cs:CV], 2017, 8 pages.

Jing, L., et al, "Self-Supervised Visual Feature Learning with Deep Neural Networks: A Survey," IEEE Transactions on Pattern Analysis and Machine Intelligence, vol. 43, No. 11, 2021, pp. 4037-4058.

Kang, G., et al, "PatchShuffle Regularization," arXiv preprint arXiv: 1707.07103v1 [cs.CV], 2017, 10 pages.

Kingma, D., et al, "Adam: A Method for Stochastic Optimization," arXiv:1412.6980v8 [cs:CV], 2015, 15 pages.

Kolesnikov, A., et al, "Revisiting Self-Supervised Visual Representation Learning," Proceedings of the IEEE/CVF Conference on Computer Vision and Pattern Recognition (CVPR), 2019, pp. 1920-1929.

Krizhevsky, A., et al, "ImageNet Classification with Deep Convolutional Neural Networks," Advances in Neural Information Processing Systems, vol. 25, 2012, 9 pages.

Litjens, G., et al, "A survey on deep learning in medical image analysis," Medical Image Analysis vol. 42, 2017, pp. 60-88.

LiTS, 2017. Results of all submissions for liver segmentation. URL:https://competitions.codalab.org/competitions/17094#results, 7 pages.

Lu, L. et al., "Deep learning and Convolutional Neural Networks for Medical Image Computing: Precision Medicine, High Performance and Large-Scale Datasets," Advances in Computer Vision and Pattern Recognition, 2017, Springer Publishing, 327 pages.

Luna, 2016. Results of all submissions for nodule false positive reduction URL:https://luna16.grand-challenge.org/results/, 2 pages.

Ma, Y., et al, "Multi-Attention Network for Thoracic Disease Classification and Localization," ICASSP 2019-2019 IEEE International Conference on Acoustics, Speech and Signal Processing (ICASSP), 2019, pp. 1378-1382.

Mahendran, A., et al, "Cross Pixel Optical-Flow Similarity for Self-Supervised Learning," Computer Vision—ACCV 2018: 14th Asian Conference on Computer Vision, 2018, Lecture Notes in Computer Science, vol. 11365, 2019, Springer International Publishing, pp. 99-116.

Menze, B.H., et al., "The Multimodal Brain Tumor Image Segmentation Benchmark (BRATS)," IEEE Transactions on Medical Imaging, vol. 34, No. 10, 2015, pp. 1993-2024.

\* cited by examiner

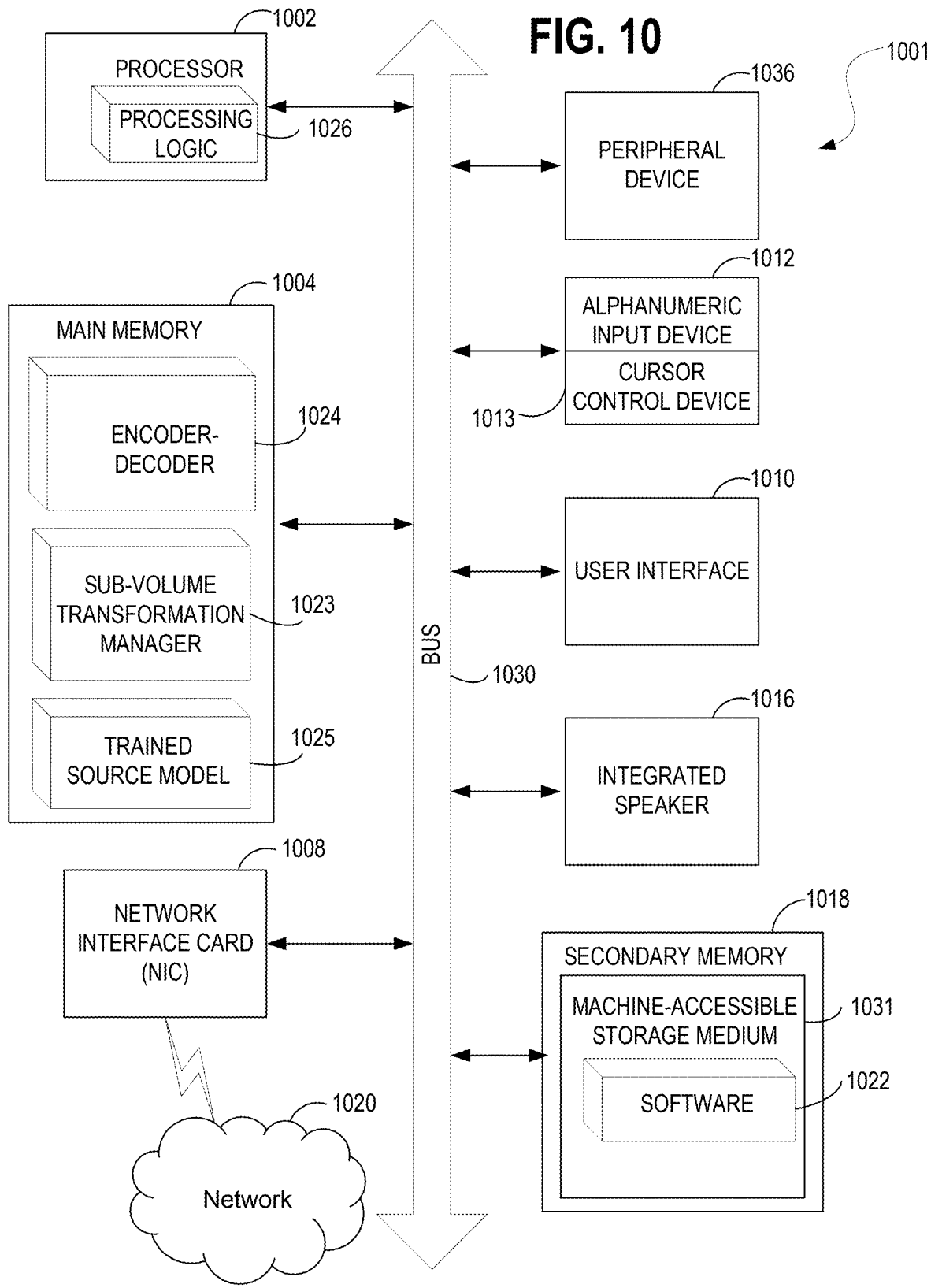

Start

A method for performing image segmentation using trained encoder-decoder networks, by performing the following operations:
1105

Initializing a neural network that includes a pre-trained encoder-decoder network and a plurality of randomly initialized classification layers appended to the decoder network of the pre-trained encoder-decoder network, wherein the pre-trained encoder-decoder network has been trained to generate an approximation of an input image that has been transformed using one or more image transformations.
1110

Identifying a group of training samples, wherein each training sample in the group of training samples includes an image.
1115

For each training sample in the group of training samples:  1120

LOOP

Applying operations associated with each layer of the pre-trained encoder network and the pre-trained decoder network to the image associated with the training sample.
1121

Determining a probability that each pixel of the image associated with the training sample corresponds to a particular image class using the plurality of classification layers.
1122

Calculating a segmentation error by comparing the probability that each pixel corresponds to a particular image class with ground truth values associated with the training sample.
1123

Updating weights associated with the encoder network, the decoder network, and the plurality of classification layers to minimize the segmentation error.
1125

End

Start
↓
A method for performing object detection, by performing the following operations: 1130
↓
Initializing a neural network by appending a feature extraction backbone of a detection network to an encoder network of a pre-trained encoder-decoder network, wherein the pre-trained encoder-decoder network has been trained to generate an approximation of an input image that has been transformed using one or more image transformations. 1135
↓
Identifying a group of training samples, wherein each training sample in the group of training samples includes an image. 1140
↓
For each training sample in the group of training samples: 1145

LOOP

Applying operations associated with each layer of the encoder network and the feature extraction backbone to the image corresponding to the training sample. 1146
↓
Identifying one or more bounding boxes corresponding to the image associated with the training sample. 1147
↓
Calculating a probability that a region inside each of the one or more bounding boxes includes a target object. 1148
↓
Calculating a detection error by comparing the probabilities associated with each region with ground truth values associated with the training sample. 1149
↓
Updating weights associated with the detection network to minimize the detection error. 1150
↓
End

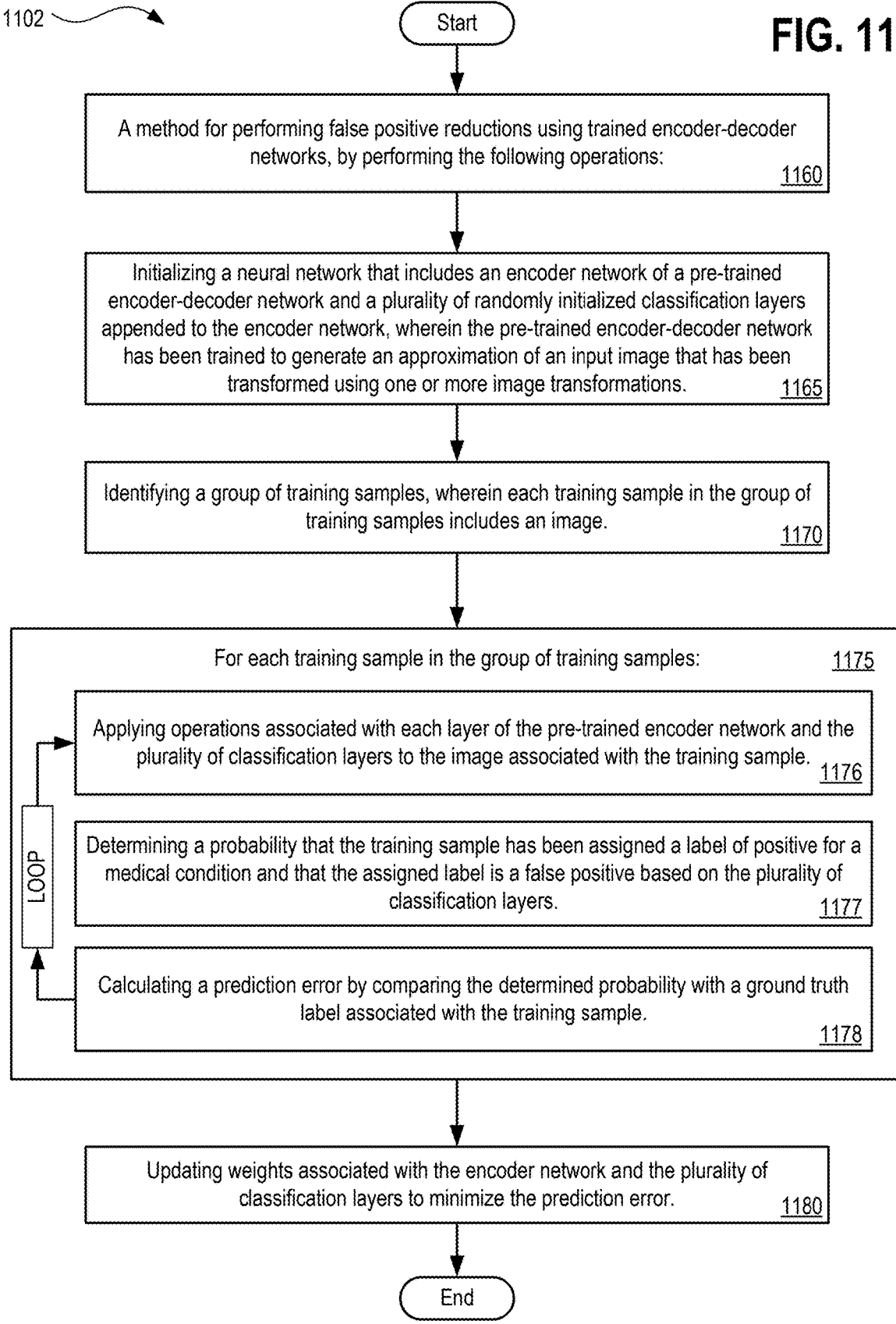

SYSTEMS, METHODS, AND APPARATUSES FOR THE GENERATION OF SOURCE MODELS FOR TRANSFER LEARNING TO APPLICATION SPECIFIC MODELS USED IN THE PROCESSING OF MEDICAL IMAGING

CLAIM OF PRIORITY

This Application is a U.S. National Phase application under 35 U.S.C. § 371 of International Application No. PCT/US20/42560, filed Jul. 17, 2020, entitled "SYSTEMS, METHODS, AND APPARATUSES FOR THE GENERATION OF SOURCE MODELS FOR TRANSFER LEARNING TO APPLICATION SPECIFIC MODELS USED IN THE PROCESSING OF MEDICAL IMAGING" and this application further claims the benefit of U.S. Provisional Application No. 62/876,502, filed Jul. 19, 2019, entitled "METHODS, SYSTEMS, AND MEDIA FOR GENERATING SOURCE MODELS FOR TRANSFER LEARNING", the entire contents of which are hereby incorporated by reference herein as though set forth in full.

GOVERNMENT RIGHTS AND GOVERNMENT AGENCY SUPPORT NOTICE

This invention was made with government support under R01 HL128785 awarded by the National Institutes of Health. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of medical imaging and analysis using convolutional neural networks for the classification and annotation of medical images, and more particularly, to systems, methods, and apparatuses for the generation of source models for transfer learning to application specific models used in the processing of medical imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of processing medical images.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

Transfer learning may be one of the most practical paradigms in deep learning for medical image analysis. In particular, use of trained source models as a starting point for training a target model for a specific application (e.g., identifying portions of a medical image that include a tumor or lesion, classifying a medical image as corresponding to a particular disease state or not, etc.) may boost the performance of the target model when used for the specific application.

However, it can be difficult to implement transfer learning for use in medical image analysis. In particular, it can be difficult to generate a suitable source model that can be used as a starting point for training an application-specific target model for several reasons. For example, in some cases, a source model may be generated using natural images (e.g., images of landscapes or other natural images rather than medical images) and then used for a medical image analysis task. However, many source models are generated using two-dimensional images, whereas many medical images used in application-specific tasks use three-dimensional imaging modalities (e.g., CT, MRI, etc.). Additionally, developing a robust source model can require a large set of annotated images for training the source model, which can be resource-intensive to assemble.

Heretofore, transfer learning has been sparsely applied in the field of medical imaging. Nevertheless, there is a massive need to provide automated analysis to medical imaging with a high degree of accuracy so as to improve diagnosis capabilities, control medical costs, and to reduce workload burdens placed upon medical professionals.

Problematically, annotating medical imaging is tedious and time-consuming, and demands costly, specialty-oriented knowledge and skills, which are not easily accessible. Furthermore, any misdiagnosis from failure to recognize or correctly identify anatomical structures and abnormalities may result in potentially devastating impacts on patient morbidity and mortality.

Embodiments described herein therefore provide enhanced solutions to improve upon conventionally known image representation and learning techniques by leveraging machine learning to generate the source models which are suitable for transfer learning to application specific models without requiring the manual annotation of medical images.

The present state of the art may therefore benefit from the systems, methods, and apparatuses for the generation of source models for transfer learning to application specific models used in the processing of medical imaging, as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 10 illustrates a diagrammatic representation of a machine in the exemplary form of a computer system, in accordance with one embodiment;

FIG. 11A depicts a flow diagram illustrating a method for performing image segmentation using trained encoder-decoder networks, in accordance with the described embodiments;

FIG. 11B depicts a flow diagram illustrating a method for performing object detection, in accordance with the described embodiments; and FIG. 11C depicts a flow diagram illustrating a method for performing false positive reductions using trained encoder-decoder networks, in accordance with the described embodiments.

DETAILED DESCRIPTION

Figure 1:
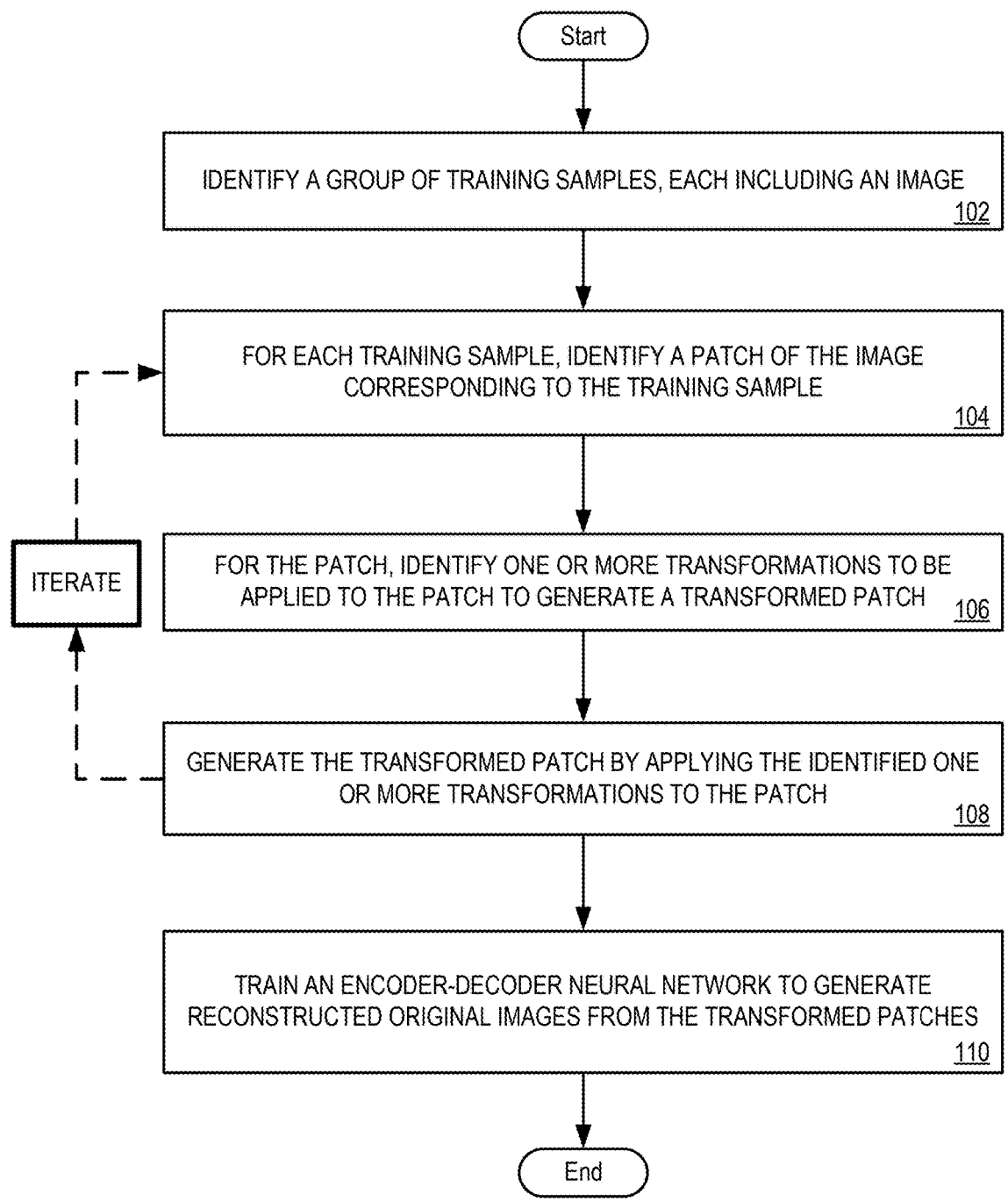
FIG. 1 depicts an exemplary process for generating source models in accordance with described embodiments.

Described herein are systems, methods, and apparatuses for the generation of source models for transfer learning to application specific models used in the processing of medical imaging.

Transfer learning from natural image to medical image has been established as one of the most practical paradigms in deep learning for medical image analysis. However, conventional approaches utilizing 3D imaging tasks in the most prominent imaging modalities (e.g., CT and MRI) have been reformulated and solved in 2D, losing the rich 3D anatomical information, thereby inevitably compromising performance of such prior known techniques.

Methods, systems, and media for generating source models for transfer learning are specifically provided. The source models significantly enhance the transfer learning performance for many medical imaging tasks including, but not limited to, disease/organ detection, classification, and segmentation.

In accordance with certain embodiments of the disclosed subject matter, a method for generating source models for transfer learning is provided, the method comprising: identifying a group of training samples, wherein each training sample in the group of training samples includes an image; for each training sample in the group of training samples: identifying an original patch of the image corresponding to the training sample; identifying one or more transformations to be applied to the original patch; generating a transformed patch by applying the one or more transformations to the identified patch; and training an encoder-decoder network using a group of transformed patches corresponding to the group of training samples, wherein the encoder-decoder network is trained to generate an approximation of the original patch from a corresponding transformed patch, and wherein the encoder-decoder network is trained to minimize a loss function that indicates a difference between the generated approximation of the original patch and the original patch.

In accordance with various embodiments, mechanisms (which can include methods, systems, and media) for generating source models for transfer learning are provided.

In some embodiments, the mechanisms described herein can generate a trained source model that can be used to train an application-specific target model. For example, in some embodiments, the source model can be a model that is trained using medical images (e.g., X-Ray images, CT images, MRI images, etc.) of a particular anatomical region (e.g., liver, chest, brain, lungs, etc.). Continuing with this example, an application-specific target model can be a model that has been trained using the trained source model to perform a specific task relating to the particular anatomical region, such as identifying portions of an image of the anatomical region that include a tumor or lesion, classifying an image of the anatomical region as associated with a particular disease state (e.g., a pulmonary embolism, having a lung nodule, and/or any other suitable disease state).

In some embodiments, the mechanisms can generate a trained source model in any suitable manner. For example, in some embodiments, the mechanisms can identify a group of training images (e.g., CT images, MM images, X-Ray images, and/or any other suitable type of images). In some embodiments, for each image in the group of training images, the mechanisms can identify at least one patch that is a portion of the image. In some embodiments, the mechanisms can, for each patch, generate a transformed patch. In some embodiments, the patch can be transformed in any suitable manner, as described below in more detail in connection with FIGS. 1 and 5-8. For example, in some embodiments, a patch can be distorted in intensity, distorted by shuffling pixels within the patch, masked in any suitable manner, and/or transformed in any other suitable manner. In some embodiments, the mechanisms can then train an encoder-decoder network using the transformed patches to recreate an approximation of the original patch. Note that the image transformations shown in and described below in connection with FIGS. 1 and 5-8 are merely examples, and, in some embodiments, the encoder-decoder network can be trained to recover any suitable image transformations, any suitable number of image transformations (e.g., one, two, three, four, and/or any other suitable number), and any suitable combination of image transformations. That is, by training the encoder-decoder network to construct an approximation of an original patch of a medical image using a patch of the medical image that has been distorted or transformed, the encoder-decoder network can learn anatomical patterns of the particular region(s) represented in the medical images of the training set. In particular, the encoder-decoder network can learn the anatomical patterns in a self-supervised manner, that is, without using a labeled or annotated training set. In some embodiments, the trained encoder-decoder network can be considered a source model that can then be used to train an application-specific target model to perform any suitable task, such as image classification, image segmentation, etc.

Note that, in some embodiments, a trained source model as described herein can be any suitable type of encoder-decoder network that can restore clean and/or natural images from any transformation or distortion applied to the image. In some embodiments, the encoder network of the encoder-decoder network can include any suitable combination of any suitable type(s) of convolutions (e.g., two-dimensional (2D) convolutions, three-dimensional (3D) convolutions, depth-wise separable convolutions, etc.), paddings (e.g., 2D zero-paddings, 3D zero-paddings, etc.), croppings, normalizations (e.g., batch normalizations, instance normalizations, layer normalizations, group normalizations, etc.), poolings (e.g., max poolings, average poolings, etc.) and/or any other operations that can be used for mapping of input images to vector spaces. In some embodiments, an encoder network can take as an input an entire image and/or an image patch of an arbitrary size (represented in 2D, 3D, and/or any other suitable number of dimensions) and map them to a vector space of arbitrary dimension.

In some embodiments, a decoder network of an encoder-decoder network can take, as an input, a vector representation of the images, produced by the encoder network, and map them back to an original input space of the encoder network. In some embodiments, a decoder network can include any suitable combination of upsamplings (e.g., 2D upsamplings, 3D upsamplings, etc.), transposed convolutions (e.g., 2D transposed convolutions, 3D transposed convolutions, etc.), convolutions (e.g., 2D convolutions, 3D convolutions, depth-wise separable convolutions, etc.), paddings (e.g., 2D zero-paddings, 3D zero-paddings, etc.), croppings, normalizations (e.g., batch normalizations, instance normalizations, layer normalizations, group normalizations, etc.), poolings (e.g., max poolings, average poolings, etc.), and/or any other suitable operations that can be used for restoration of encoded vectors to the original input space. Note that, together, the encoder network and the decoder network of the encoder-decoder network can learn discriminative features to distinguish one input image from the others.

In some embodiments, techniques to train an encoder-decoder network to be a source model can include: selecting a random training sample from a training dataset; normalizing training sample (e.g., to remove dataset bias, to remove dataset variance, and/or to match a distribution required by a particular network architecture corresponding to the encoder-decoder network); applying one or more image transformations to the training sample (e.g., as described below in connection with FIGS. 1 and 5-8); encoding the normalized and transformed training sample to a lower dimensional vector space using an encoder network of the encoder-decoder network; using a decoder network of the encoder-decoder network to decode the lower dimensional vector space back to an original input sample space corresponding to the training sample; matching an output of the decoder network with the original training sample (that is, before any image transformations were applied to the training sample); measuring an amount of mismatch between the output of the decoder and the original sample (e.g., using Euclidean distance, and/or any other suitable metric(s)); updating weights of the encoder-decoder network to minimize the amount of mismatch; and looping through the above techniques for the training samples of the training dataset until it is determined that training of the encoder-decoder network has converged.

Note that, once an encoder-decoder network has been trained (that is, once it is determined that convergence has been reached), the trained encoder-decoder network can be used to restore an image from image transformations the encoder-decoder network was trained on. For example, in some embodiments, the mechanisms can: select a transformed image or image patch that is to be recovered; normalize the image or image patch using the normalization techniques used during training of the encoder-decoder network; and apply each operation of the encoder-decoder network using the learned weights associated with the trained encoder-decoder network. In some embodiments, the output of the decoder network can be the image restored from the image transformation. In some embodiments, any suitable post-processing of the restored image can be applied.

In some embodiments, a trained encoder-decoder network can serve as a source model that can then be used to train any suitable type of application-specific target model. Note that, an application-specific target model can perform any suitable task using images of any suitable anatomical region. For example, in some embodiments, an application-specific target model can perform an image classification task. As a more particular example, in some embodiments, an application-specific target model can be trained to classify images as healthy or as representing a particular disease state. As a specific example, an application-specific target model can be trained to classify an image of a lung as including a lung nodule or other pathology or as representing healthy tissue for any suitable purpose, such as reducing false positives of identified lung nodules. As another specific example, an application-specific target model can be trained to classify an image of a lung as including a pulmonary embolism or as representing healthy tissue for any suitable purpose, such as reducing false positives of identified pulmonary embolisms. As yet another specific example, an application-specific target model can be trained to classify an image of a lung as being associated with a particular category of a group of categories, such as healthy, or belonging to one of a group of disease states (e.g., having a lung nodule, having a pulmonary embolism, etc.). As still another specific example, an application-specific target model can be trained to classify an image of a carotid artery to identify portions of the image, such as a background area of the image, a Region of Interest (RoI), a carotid bulb included in the image, and/or any other suitable portions of the image.

As another example, in some embodiments, an application-specific target model can be trained to perform a segmentation task. As a more particular example, in some embodiments, an application-specific target model can be trained to segment portions of an image as belonging to particular categories. As a specific example, in some embodiments, an application-specific target model can be trained to identify portions of a lung image that correspond to different image categories, such as a background region of the image, healthy lung tissue, a lung nodule, etc. As another specific example, in some embodiments, an application-specific target model can be trained to identify portions of a liver image that correspond to different image categories, such as a background region of the image, healthy liver tissue, a tumor, etc. As yet another specific example, in some embodiments, an application-specific target model can be trained to identify portions of a brain image that correspond to different image categories, such as a background region of the image, healthy brain tissue, a tumor, etc.

Note that, in some embodiments, a source model generated using the techniques described herein can be generated using images associated with a particular imaging modality (e.g., CT images, X-Ray images, MRI images, etc.), and an application-specific model can be trained using the generated source model, but can be trained to take, as inputs, images acquired with a different imaging modality than that used to generate the source model. For example, in some embodiments, a source model can be trained using CT images, and an application-specific model can be trained using the generated source model, but that uses MM images as inputs.

More detailed techniques for applying a trained source model to train different types of application-specific models for different purposes are described below.

FIG. 1 depicts an exemplary process for generating source models in accordance with described embodiments.

According to described embodiments, blocks of process 100 may be executed on any suitable device, such as a server, a desktop computer, a laptop computer, and/or any other suitable type of device. Additionally or alternatively, in some embodiments, multiple devices can be used to implement blocks of process 100.

Process 100 can begin at 102 by identifying a group of training samples, each including an image. In some embodiments, each image associated with a training sample can be any suitable type of image. For example, in some embodiments, an image can be a natural image. As another example, in some embodiments, an image can be a medical image of an anatomical region of a body of a patient (e.g., an image of a lung, an image of a brain, an image of a liver, and/or any other suitable anatomical region). As a more particular example, in instances in which an image is a medical image, the medical image can be captured using any suitable device (e.g., an MRI scanner, a CT scanner, and/or any other suitable type of imaging device). As another more particular example, in some embodiments, an image can be a frame from a video recorded during a medical procedure. Note that, in some embodiments, an image associated with a training sample can be in any suitable format. For example, in some embodiments, an image can be a two-dimensional (2D) image. As another example, in some embodiments, an image can be a three-dimensional (3D) image.

In some embodiments, process 100 can identify the group of training samples in any suitable manner. For example, in some embodiments, process 100 can identify the group of training samples from a dataset of images (e.g., a dataset of lung CT images, a dataset of brain MRI images, and/or any other suitable dataset). Note that, in some embodiments, the group of training samples can include any suitable number (e.g., one hundred, two hundred, one thousand, and/or any other suitable number) of training samples.

Note that, in some embodiments, process 100 can perform any suitable pre-processing of images corresponding to the group of training samples. Additionally, in some embodiments, process 100 can eliminate images from the group of training samples based on any suitable criteria, such as a quality of an image (e.g., based on whether the image is blurry, based on whether the image predominantly includes a particular anatomical region of interest, and/or any other suitable criteria).

At 104, process 100 can, for each training sample, identify a patch of the image corresponding to the training sample. In some embodiments, a patch of the image can be any suitable portion or subset of the image. In some embodiments, the patch can be of any suitable size (e.g., 20 pixels×20 pixels, 30 pixels×30 pixels, 20 pixels×10 pixels, and/or any other suitable size). Note that, in some embodiments, a size of the patch can be selected randomly, such that patches corresponding to different training samples are of different sizes. In some embodiments, process 100 can identify the patch of the image in any suitable manner. For example, in some embodiments, process 100 can identify a random location within the image and can generate the patch by cropping the image centered at the identified random location to a size of the patch. Note that, in some embodiments, the identified patch is referred to as X herein.

At 106, process 100 can, for the patch, identify one or more transformations to be applied to the patch to generate a transformed patch. In some embodiments, process 100 can identify the one or more transformations from any suitable group of candidate transformations. For example, in some embodiments, the group of candidate transformations can include: a non-linear intensity transformation, a local pixel shuffling transformation, an out-painting transformation, and an in-painting transformation. In some embodiments, the group of candidate transformations can include any suitable categories, such as a distortion-based transformation category and a painting-based transformation category. For example, in some embodiments, a non-linear intensity transformation and a local pixel shuffling transformation can be associated with a distortion-based transformation category. As another example, in some embodiments, an out-painting transformation and an in-painting transformation can be associated with a painting-based transformation category. Non-linear intensity transformations, local pixel shuffling transformations, out-painting transformations, and in-painting transformations are described below in more detail in connection with 108.

In some embodiments, process 100 can identify the one or more transformations to be applied to the patch in any suitable manner. For example, in some embodiments, each distortion-based transformation (e.g., non-linear intensity transformation and local pixel shuffling) can be associated with an independent probability that the transformation is applied to the patch. As a more particular example, a non-linear intensity transformation can be associated with a probability $P_{non-linear}$ that indicates whether the non-linear intensity transformation is applied to the patch. As another more particular example, a local pixel shuffling transformation can be associated with a probability $P_{shuffle}$ that indicates whether a local pixel shuffling transformation is applied to the patch. In some embodiments, process 100 can determine whether a non-linear intensity transformation is to be applied to the patch based on $P_{non-linear}$. In some embodiments, process 100 can independently determine whether a local pixel shuffling transformation is to be applied to the patch based on $P_{shuffle}$. That is, in some embodiments, process 100 can determine that any combination of non-linear intensity transformation and local pixel shuffling are to be applied to the patch (e.g., both non-linear intensity transformation and local pixel shuffling, neither non-linear intensity transformation nor local pixel shuffling, or one of non-linear intensity transformation and local pixel shuffling) based on each probability. Note that, in some embodiments, $P_{non-linear}$ and $P_{shuffle}$ can have the same value. Alternatively, in some embodiments, $P_{non-linear}$ and $P_{shuffle}$ can have different values.

As another example, in some embodiments, process 100 can determine whether a painting-based transformation (e.g., one of out-painting or in-painting) is to be applied to the transformation based on a probability $P_{painting}$. In some embodiments, a painting-based transformation can be applied independently of whether a non-linear intensity transformation and/or a local pixel shuffling transformation are to be applied to the patch. That is, in some embodiments, process 100 can determine that any suitable combination of a non-linear intensity transformation, a local pixel shuffling transformation, and/or a painting-based transformation are to be applied to the patch (including none).

Note that, in some embodiments, only one of an out-painting transformation and an in-painting transformation can be applied to the patch. Therefore, in some embodiments, process 100 can first determine whether a painting-based transformation is to be applied to the patch using $P_{painting}$ and, in response to determining that a painting-based transformation is to be applied to the patch, process 100 can select one of an out-painting transformation and an in-painting transformation. In some embodiments, process 100 can select one of an out-painting transformation and in-painting transformation in any suitable manner. For example, in some embodiments, process 100 can select one of an out-painting transformation and in-painting transformation based on a probability $P_{out-painting}$ that indicates a probability that the out-painting transformation is selected and where $1-P_{out-painting}$ indicates a probability that the in-painting transformation is selected. In some embodiments, $P_{out-painting}$ can be 0.5, and/or any other suitable value.

Note that, in some embodiments, each of $P_{non-linear}$, $P_{shuffle}$, and $P_{painting}$ can have any suitable values (e.g., 0.1, 0.5, 0.7, and/or any other suitable values). Additionally, note that, in some embodiments, $P_{non-linear}$, $P_{shuffle}$, and/or $P_{painting}$ can have the same value or different values.

In some embodiments, process 100 can identify the one or more transformations such that a group of potential transformation combinations is: {no transformation; local pixel shuffling; non-linear intensity transformation; in-painting; out-painting; local pixel shuffling and non-linear intensity transformation; local pixel shuffling and in-painting; local pixel shuffling and out-painting; non-linear intensity transformation and in-painting; non-linear intensity transformation and out-painting; local pixel shuffling, non-linear intensity transformation, and in-painting; and local pixel shuffling, non-linear intensity transformation, and out-painting}. That is, in a group of possible transformations that includes a non-linear intensity transformation, local pixel shuffling, out-painting, and in-painting, process 100 can identify a combination of transformations selected from a group of 12 potential transformation combinations.

At 108, process 100 can generate the transformed patch by applying the identified one or more transformations to the patch. Note that, in some embodiments, the transformed patch is referred to as $\tilde{X}$. In some embodiments, in instances in which multiple transformations are to be applied (e.g., non-linear intensity transformation and local pixel shuffling, and/or any other suitable combination of multiple transforms), process 100 can apply each transformation of the multiple transformations in any suitable order. Techniques for applying a non-linear intensity transformation, a local pixel shuffling transformation, an out-painting transformation, and an in-painting transformation are described below in more detail.

In some embodiments, process 100 can apply a non-linear intensity transformation to the patch. In some embodiments, a non-linear intensity transformation can allow a model to learn to restore intensity values of an original patch that has been transformed with a set of non-linear functions. In particular, because absolute intensity values (i.e., Hounsfield units) in CT scans or relative intensity values in other imaging modalities (e.g., MRI images, X-Ray images, etc.) convey important information about the underlying structures and organs, training a model using images that have been distorted using a non-linear intensity transformation can allow the model to learn the appearance of anatomic structures present in the images. Note that because numeric values of Hounsfield units correspond to specific substances of the human body, Hounsfield units in CT scans can be used as a strong source of pixel-wise supervision. For example, if the encoder-decoder network (e.g., as described below in connection with 110) can distinguish the original Hounsfield units, it can be assumed that the encoder-decoder network recognizes the underlying structures and substances in the CT scans. By applying a non-liner intensity transformation to the patch, process 100 can distort the original Hounsfield units in a CT scan can then let the encoder-decoder network learn to recover the original Hounsfield units (e.g., during training of the encoder-decoder network, as described below in connection with 110) based on the appearance of anatomic structures present in the images, and, by doing so, the encoder-decoder network can learn the visual representation of anatomical regions in the CT scans. Note that this technique can be applied to other imaging modalities, such as X-ray images, MM images, ultrasound images, etc.

In some embodiments, a non-linear intensity transformation can be applied in any suitable manner. For example, a non-linear intensity transformation can use a monotonic function that sets a pixel associated with a first value to have an intensity of a second value. In some embodiments, the monotonic function can be any suitable type of function, such as a Bezier curve, such as that depicted at FIG. 5. As a more particular example, in some embodiments, a Bezier Curve can be generated from two endpoints (referred to herein as $P_0$ and $P_3$) and two control points ($P_1$ and $P_2$). As a specific example, a Bezier curve can be generated using a function such as:

$$B(t)=(1-t)^3P_0+3(1-t)^2tP_1+3(1-t)t^2P_2+t^3P_3, t\in[0,1].$$

In some embodiments, t can be any suitable fractional value along the length of the curve.

According to certain embodiments, process 100 may apply a local pixel shuffling transformation to the patch (refer to FIG. 5 described below in greater detail).

According to certain embodiments, process 100 may apply an out-painting transformation to the patch at 108 (refer to FIG. 6 described below in greater detail).

According to certain embodiments, process 100 may apply an in-painting transformation to the patch at 108 (refer to FIG. 7 described below in greater detail).

According to certain embodiments, after block 108, process 100 may loop back and iterate by returning to block 104 so as to identify a second patch for the training sample, such as a different cropped region of the image corresponding to the training sample (refer to FIG. 8 described below in greater detail).

Lastly, processing completes at block 110, where process 100 trains an encoder-decoder neural network to generate reconstructed approximations of original patches from the transformed patches.

In accordance with another embodiment of process 100, each image is a three-dimensional image.

In accordance with another embodiment of process 100, the one or more transformations include changing an intensity value of each pixel in the original patch.

In accordance with another embodiment of process 100, the one or more transformations include for each pixel in the original patch, changing a location of the pixel from a first location to a second location.

In accordance with another embodiment of process 100, the one or more transformations include masking one or more portions of the patch.

In accordance with another embodiment of process 100, identifying the one or more transformations to be applied to the original patch includes: identifying a group of candidate transformations, wherein each transformation in the group of candidate transformations is associated with a probability that the transformation will be selected as one of the one or more transformations to be applied to the original patch; and selecting the one or more transformations based on the probability associated with each transformation in the group of candidate transformations.

In accordance with a particular embodiment, there is a non-transitory computer-readable medium containing computer executable instructions that, when executed by a processor, the instructions cause the processor to perform operations for generating source models for transfer learning, including: identifying a group of training samples, wherein each training sample in the group of training samples includes an image; in which the processing further includes, for each training sample in the group of training samples, at least (i) identifying an original patch of the image corresponding to the training sample; (ii) identifying one or more transformations to be applied to the original patch; and (iii) generating a transformed patch by applying the one or more transformations to the identified patch. Lastly, process 100 trains an encoder-decoder network using a group of transformed patches corresponding to the group of training samples, wherein the encoder-decoder network is trained to generate an approximation of the original patch from a corresponding transformed patch, and wherein the encoder-decoder network is trained to minimize a loss function that indicates a difference between the generated approximation of the original patch and the original patch.

Figure 2:
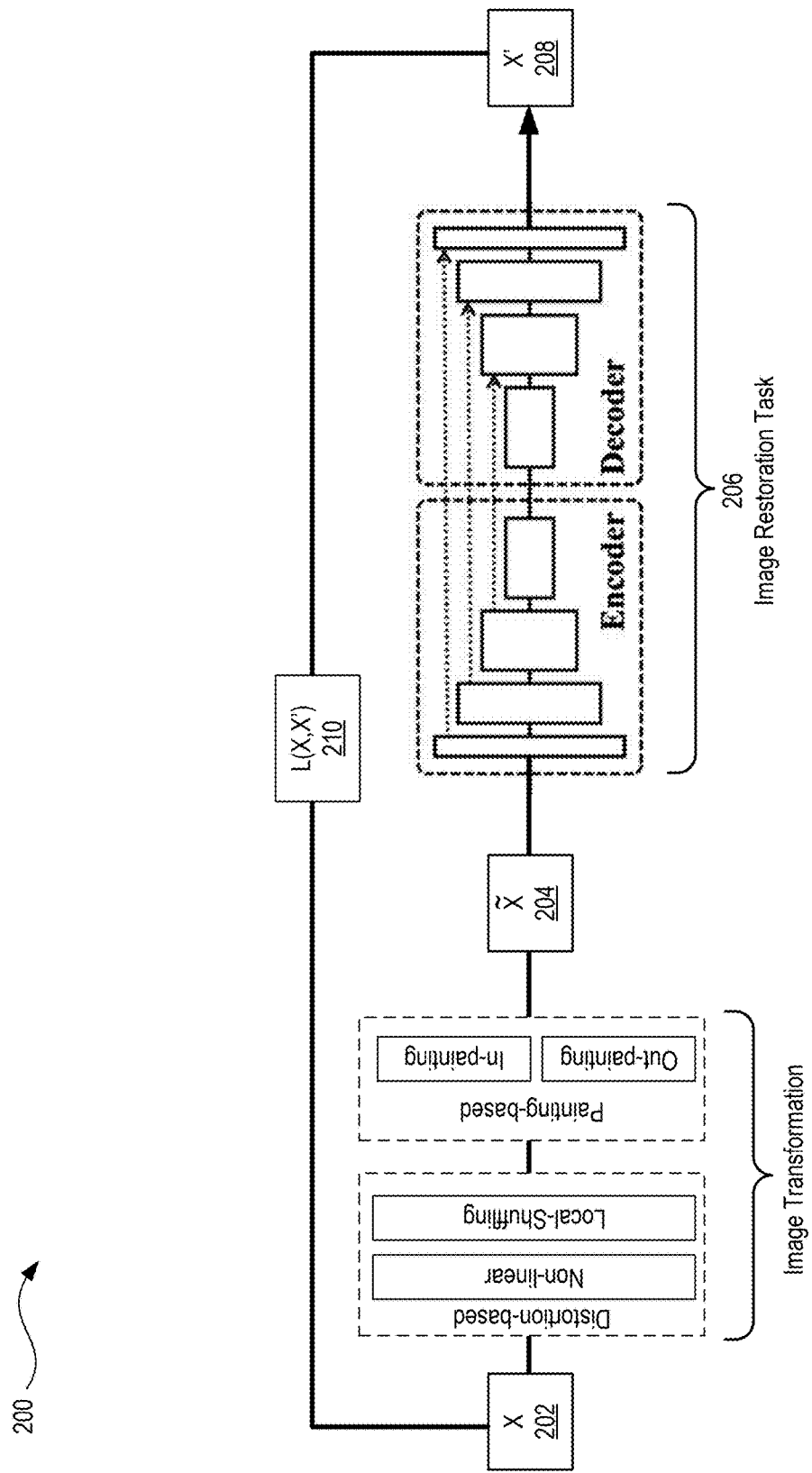
FIG. 2 depicts an exemplary schematic diagram of a network for generating source models in accordance with described embodiments.

FIG. 2 depicts an exemplary schematic diagram of a network for generating source models in accordance with described embodiments.

More particularly, FIG. 2 provides an example 200 of a model architecture for training the encoder-decoder neural network to generate reconstructed approximations of original patches from transformed patches in shown in accordance with some embodiments of the disclosed subject matter.

As described above in connection with 104 of FIG. 1, the model can begin with an original patch 202 of an image corresponding to a training sample (referred to as X), which can be transformed to a transformed patch 204, referred to as X̃, as described above in connection with 108 of FIG. 1. An encoder-decoder network 206 can then be trained to take transformed patch 204 as an input, and output a reconstructed original patch 208, referred to as X'. In some embodiments, encoder-decoder network 206 can be trained using transformed patches generated from the group of training samples described above in connection with 102 of FIG. 1.

In some embodiments, encoder-decoder network 206 can be trained to minimize any suitable loss function L(X,X'). For example, in some embodiments, the loss function can be based on a distance metric that indicates a similarity between original image X and reconstructed image X'. In some such embodiments, any suitable distance metric can be used by the loss function, such as a Euclidean distance, a Manhattan distance, and/or any other suitable distance metric. In some embodiments, any suitable optimization algorithm(s) can be used (e.g., the Adam optimizer, an optimizer that uses Stochastic Gradient Descent, RMSProp, Adadelta, Adagrad, and/or any other suitable optimizer). In some embodiments, any suitable learning rate can be used.

Note that, in some embodiments, encoder-decoder network 206 can be any suitable type of encoder-decoder network (e.g., a U-Net, a UNet++ network, a fully convolutional network, and/or any other suitable type of encoder-decoder network) where the encoder takes an input and generates an output that best approximates a ground truth (or expected ground truth). For example, in some embodiments, a ground truth can include an original patch of an image, a segmentation map, and/or any other suitable ground truth. In some embodiments, an encoder portion and a decoder portion of encoder-decoder network 206 can have any suitable architecture with any suitable number of layers, as shown in FIG. 2.

With reference again to FIG. 1, in accordance with certain embodiments, the trained encoder-decoder network can be used for any suitable purpose. For example, in some embodiments, the trained encoder-decoder model can be used as a source model used to train an application-specific target model for any suitable purpose. For example, in some embodiments, the application-specific target model can be trained to perform any suitable classification task or segmentation task using the trained encoder-decoder model. As a more particular example, in an instance in which the encoder-decoder model is trained using brain MRI images (e.g., to learn a representation of brain structure in MRI images), the trained encoder-decoder model can be used as a source model to train an application-specific model to perform a segmentation task using brain MM images (e.g., to identify portions of a brain MM image that include a tumor and portions that include healthy regions, and/or to perform any other suitable segmentation task). As another more particular example, in an instance in which the encoder-decoder model is trained using chest X-Rays (e.g., to learn a representation of chest anatomy in X-Ray images), the trained encoder-decoder model can be used as a source model to train an application-specific model to perform any suitable classification task using chest X-Rays (e.g., to indicate whether an input chest X-Ray image represents a particular disease state or not, and/or any other suitable classification task). Note that, in some embodiments, an application-specific model can be trained to perform any suitable task, such as lung nodule false positive reduction, lung nodule segmentation, pulmonary embolism false positive reduction, liver segmentation, pulmonary disease classification, bulb and background classification, brain tumor segmentation, and/or any other suitable task using a trained encoder-decoder network (e.g., trained using the techniques described above in connection with FIG. 1) that has been trained using images of a corresponding anatomical region. Additionally, note that, in some embodiments, the techniques described above can be applied to any suitable anatomical region.

Note that, in general, any suitable portion of a trained encoder-decoder network may be used as a source model to train an application-specific target model. In some embodiments, one or more portions of the trained encoder-decoder network can be selected for initializing one or more portions of an application-specific target model based on a task to be performed by the application-specific target model. For example, in instances in which the application-specific target model is to perform an object detection task, a pretrained encoder portion of the trained encoder-decoder network can be used to train the application-specific target model in any suitable manner, such as by initializing weights associated with a feature extraction portion of a detection framework the application-specific target model. As another example, in instances in which the application-specific target model is to perform a target segmentation task, a pre-trained encoder portion and a pre-trained decoder portion of the trained encoder-decoder network can be used to initialize an encoder-decoder portion of a segmentation framework of the application-specific target model. As yet another example, in instances in which the application-specific target model is to perform a target classification task, a pre-trained encoder portion of the trained encoder-decoder network can be used to initialize an encoder portion of a classification framework of the application-specific target model. Techniques for training specific application-specific target models using the trained encoder-decoder network are described below in more detail.

In some embodiments, the trained encoder-decoder network can be used for lesion detection, such as detecting lung nodules and/or detecting pulmonary embolisms. In some embodiments, the trained encoder-decoder network can be used in any suitable manner. For example, in some embodiments, an application-specific target model for lesion detection can use a trained encoder network of the trained encoder-decoder network. As a more particular example, in some embodiments, the application-specific target model for lesion detection can include a detection framework that includes a feature extractor portion. In some embodiments, weights associated with the feature extractor portion of the detection framework can be initialized using the trained encoder network. Note that, in some embodiments, other portions of the detection framework can have weights that are randomly initialized. In some embodiments, a random training sample can be selected from a lesion detection training set. In some embodiments, the operations of the pre-trained encoder (e.g., one or more image transformations) can then be applied to the training sample, and the transformed training sample can then be an input to any suitable type of detection framework to identify bounding boxes and probabilities that each region in each bounding box corresponds to a nodule or lesion. A detection error can then be computed by comparing the detected probabilities with a ground-truth corresponding to the training sample. In some embodiments, weights of the encoder network and the detection framework can then be updated to minimize the detection errors. In some embodiments, a new training sample can then be selected, and the techniques described above can be repeated with different training samples of the lesion detection training set until it is determined that convergence has been reached.

In some embodiments, the trained encoder-decoder network can be used for reducing false positive values associated with lung nodule detection. In some embodiments, the trained encoder-decoder network can be used in any suitable manner. For example, in some embodiments, an application-specific target model for false positive reduction can initially include the trained encoder network and any suitable number of randomly initialized classification layers to an end of the encoder network. In some embodiments, a random training sample can then be selected from a lung nodule false positive reduction training dataset. In some embodiments, the operations of the pre-trained encoder (e.g., one or more image transformations) can then be applied to the training sample, and the training sample can then be an input to the classification layers to calculate a probability that the training sample corresponds to a false positive. In some embodiments, a prediction error can then be computed by comparing the calculated probability with a ground truth corresponding to the training sample. In some embodiments, weights of the encoder network and the classification layers can then be updated to minimize the prediction errors. In some embodiments, a new training sample can then be selected, and the techniques described above can be repeated with different training samples of the lung nodule false positive reduction training dataset until it is determined that convergence has been reached.

In some embodiments, the trained encoder-decoder network can be used for lung nodule segmentation. In some embodiments, the trained encoder-decoder network can be used in any suitable manner. For example, in some embodiments, an application-specific target model for lung nodule segmentation can initially include the trained encoder-decoder network and any suitable number of randomly initialized classification layers to an end of the decoder, where the number of layers matches a number of classes that are to be segmented. In some embodiments, a random training sample can be selected from a lung nodule segmentation training dataset. In some embodiments, the operations of the trained encoder network and the trained decoder network can be applied to the training sample to calculate a probability that each pixel belongs to a lung nodule. In some embodiments, a segmentation error can be computed by comparing the predicted probability with a ground truth associated with the training sample. In some embodiments, weights of the encoder network, the decoder network, and the classification layers can then be updated to minimize the segmentation error. In some embodiments, a new training sample can then be selected, and the techniques described above can be repeated with different training samples of the lung nodule segmentation training dataset until it is determined that convergence has been reached.

In some embodiments, the trained encoder-decoder network can be used for pulmonary embolism false positive reduction. In some embodiments, the trained encoder-decoder network can be used in any suitable manner. For example, in some embodiments, an application-specific target model for pulmonary embolism false positive reduction can initially include the trained encoder network, and can have any suitable number of randomly initialized classification layers appended to an end of the encoder network. In some embodiments, a random training sample can be selected from a pulmonary embolism false positive reduction training dataset. In some embodiments, operations of the trained encoder network and the classification layers can be applied to training sample to calculate a probability of the training sample corresponding to a false positive. In some embodiments, an error of the prediction can be calculated by comparing the calculated probability with a ground truth associated with the training sample. In some embodiments, weights of the encoder network and the classification layers can be updated to minimize the prediction error. In some embodiments, a new training sample can then be selected, and the techniques described above can be repeated with different training samples of the pulmonary embolism false positive reduction dataset until it is determined that convergence has been reached.

In some embodiments, the trained encoder-decoder network can be used for pulmonary embolism segmentation. In some embodiments, the trained encoder-decoder network can be used in any suitable manner. For example, in some embodiments, an application-specific target model for pulmonary embolism segmentation can initially include the trained encoder-decoder network, and can have any suitable randomly initialized classification layers appended to an end of the decoder network, where a number of classification layers corresponds to a number of segmentation classes. In some embodiments, a random training sample can be selected from a pulmonary embolism segmentation dataset. In some embodiments, operations of the trained encoder network and the trained decoder network can be applied to the training sample to calculate a probability of each pixel being part of a pulmonary embolus. In some embodiments, a segmentation error can be calculated by comparing the probability with a ground truth associated with the training sample. In some embodiments, weights of the encoder network the decoder network, and the classification layers can be updated to minimize the segmentation error. In some embodiments, a new training sample can then be selected, and the techniques described above can be repeated with different training samples of the pulmonary embolism segmentation dataset until it is determined that convergence has been reached.

In some embodiments, the trained encoder-decoder network can be used for brain tumor segmentation. In some embodiments, the trained encoder-decoder network can be used in any suitable manner. For example, in some embodiments, an application-specific target model for brain tumor segmentation can initially include the trained encoder-decoder network, and can have any suitable randomly initialized classification layers appended to an end of the decoder network, where a number of classification layers corresponds to a number of segmentation classes. In some embodiments, a random training sample can be selected from a brain tumor segmentation training dataset. In some embodiments, operations of the trained encoder network and the trained decoder network can be applied to the training sample to compute a probability of each pixel being part of a brain tumor. In some embodiments, a segmentation error can be calculated by comparing the probability with a ground truth associated with the training sample. In some embodiments, weights of the encoder network, the decoder network, and the classification layers can be updated to minimize the segmentation error. In some embodiments, a new training sample can then be selected, and the techniques described above can be repeated with different training samples of the brain tumor segmentation dataset until it is determined that convergence has been reached.

In some embodiments, the trained encoder-decoder network can be used for image registration. In some embodiments, the trained encoder-decoder network can be used in any suitable manner. For example, in some embodiments, an application-specific target model for image registration can initially include the trained encoder-decoder network. In some embodiments, a training sample which is to be registered to a fixed image or template can be selected. In some embodiments, operations of the trained encoder network and the trained decoder network can be applied to the training sample to determine a registration field for the training sample. In some embodiments, the registration field can be applied to the training sample, and a registration error can be computed by comparing a resultant image to a ground truth associated with the training sample. In some embodiments, weights of the encoder network and the decoder network can be updated to minimize the registration error. In some embodiments, a new training sample can then be selected, and the techniques described above can be repeated with different training samples until it is determined that convergence has been reached.

Note that the examples described above for training different application-specific target models are given merely as examples, and, in some embodiments, a trained encoder-decoder network can be a source model that is used to train any suitable type of application-specific target model that is trained to perform any suitable function(s).

Figure 3:
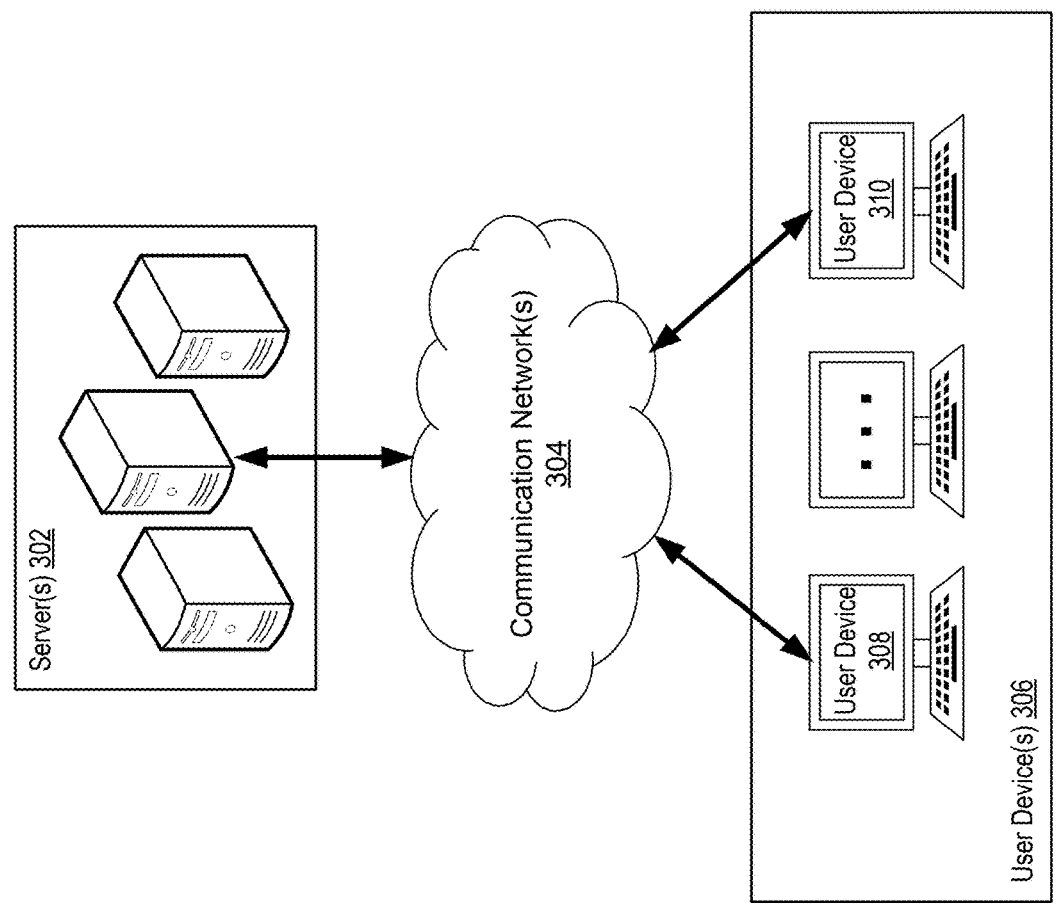
FIG. 3 depicts another exemplary schematic diagram of an illustrative system suitable for implementation of mechanisms described herein for generating source models in accordance with described embodiments.

FIG. 3 depicts another exemplary schematic diagram of an illustrative system suitable for implementation of mechanisms described herein for generating source models in accordance with described embodiments.

As illustrated, hardware 300 can include a server 302, a communication network 304, and/or one or more user devices 306, such as user devices 308 and/or 310.

Server 302 can be any suitable server(s) for storing information, datasets, programs, and/or any other suitable type of content. For example, in some embodiments, server 302 can store any suitable datasets used for training, validating, or testing a network for generating source models. In some embodiments, server 302 can transmit any portion of any suitable dataset to user devices 306, for example, in response to a request from user devices 306. Note that, in some embodiments, server 302 can execute any suitable programs or algorithms for generating source models for transfer learning. For example, in some embodiments, server 302 can execute any of the blocks shown in and described above in connection with FIG. 1 for generating source models. In some such embodiments, server 302 can receive any suitable parameters associated with training the network (e.g., a learning rate to be used, an indication of an optimization library to be used, an architecture of an encoder-decoder network to be used, and/or any other suitable parameters) from user devices 306. In some embodiments, server 302 can be omitted.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links to communication network 304 that can be linked via one or more communications links to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices. In some embodiments, user devices 306 can perform any suitable function(s). For example, in some embodiments, user devices 306 can execute any suitable blocks shown in and described above in connection with FIG. 1 for generating source models. As another example, in some embodiments, user devices 306 can initiate execution of any suitable blocks of process 100 on server 302, for example, by transmitting instructions to server 302 in connection with any suitable parameters for generating source models. In some embodiments, user devices 306 can include any suitable types of user devices, such as a desktop computer, a laptop computer, a mobile phone, a tablet computer, and/or any other suitable type of user device.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Server 302 and user devices 306 can be implemented using any suitable hardware in some embodiments. For example, in some embodiments, devices 302 and 306 can be implemented using any suitable general-purpose computer or special-purpose computer. For example, a mobile phone may be implemented using a special-purpose computer. Any such general-purpose computer or special-purpose computer can include any suitable hardware.

Figure 4:
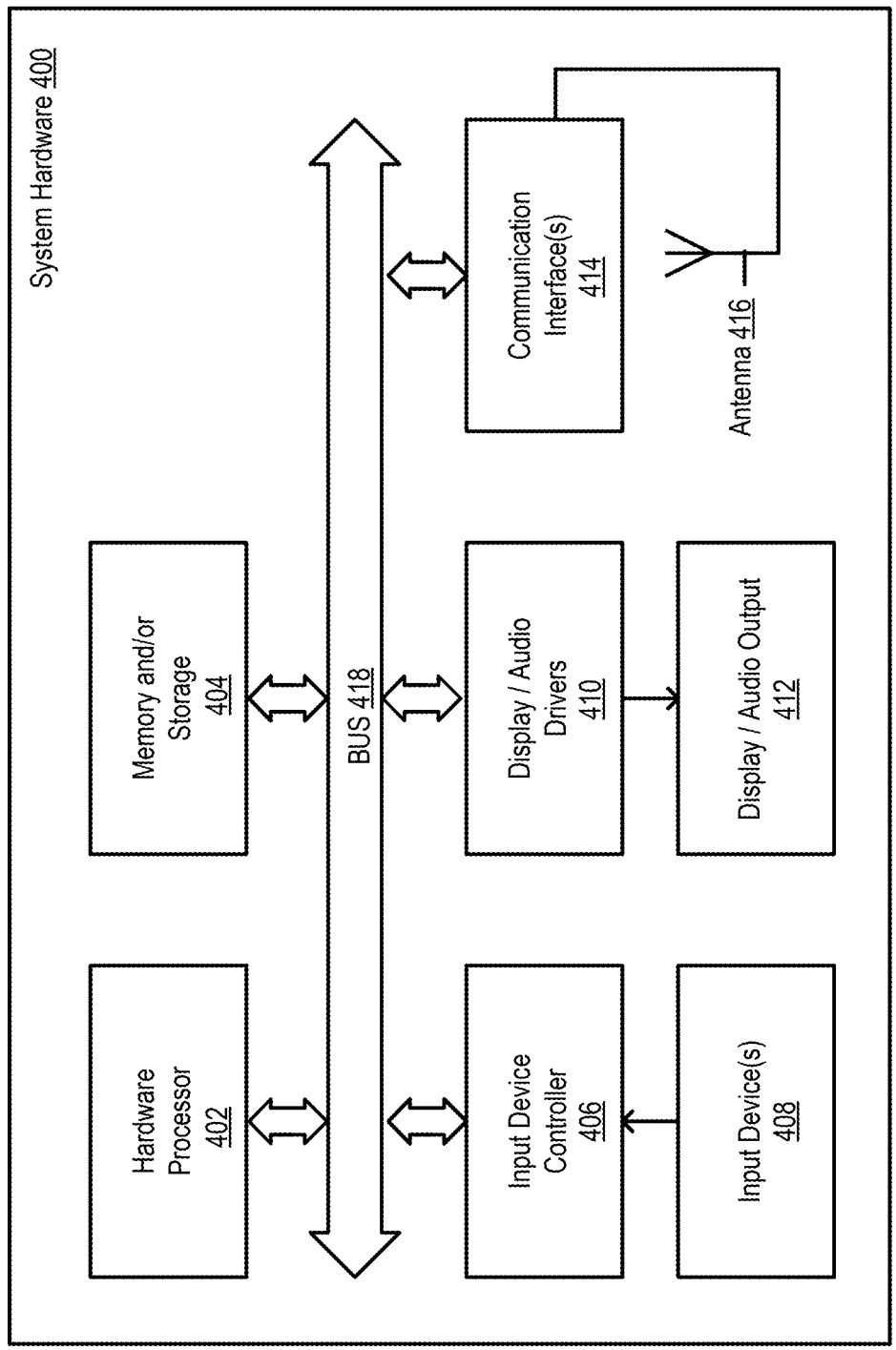
FIG. 4 depicts exemplary system hardware that may be used in a server and/or a user device of FIG. 3 in accordance with described embodiments.

FIG. 4 depicts exemplary system hardware that may be used in a server and/or a user device of FIG. 3 in accordance with described embodiments.

Such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a server program stored in memory and/or storage of a server, such as server 302. In some embodiments, hardware processor 402 can be controlled by a computer program stored in memory and/or storage 404 of user device 306.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in system hardware 400 in accordance with some embodiments.

In some embodiments, at least some of the above described blocks of the process of FIG. 1 can be executed or performed in any order or sequence not limited to the order and sequence shown in and described in connection with the figure. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 5:
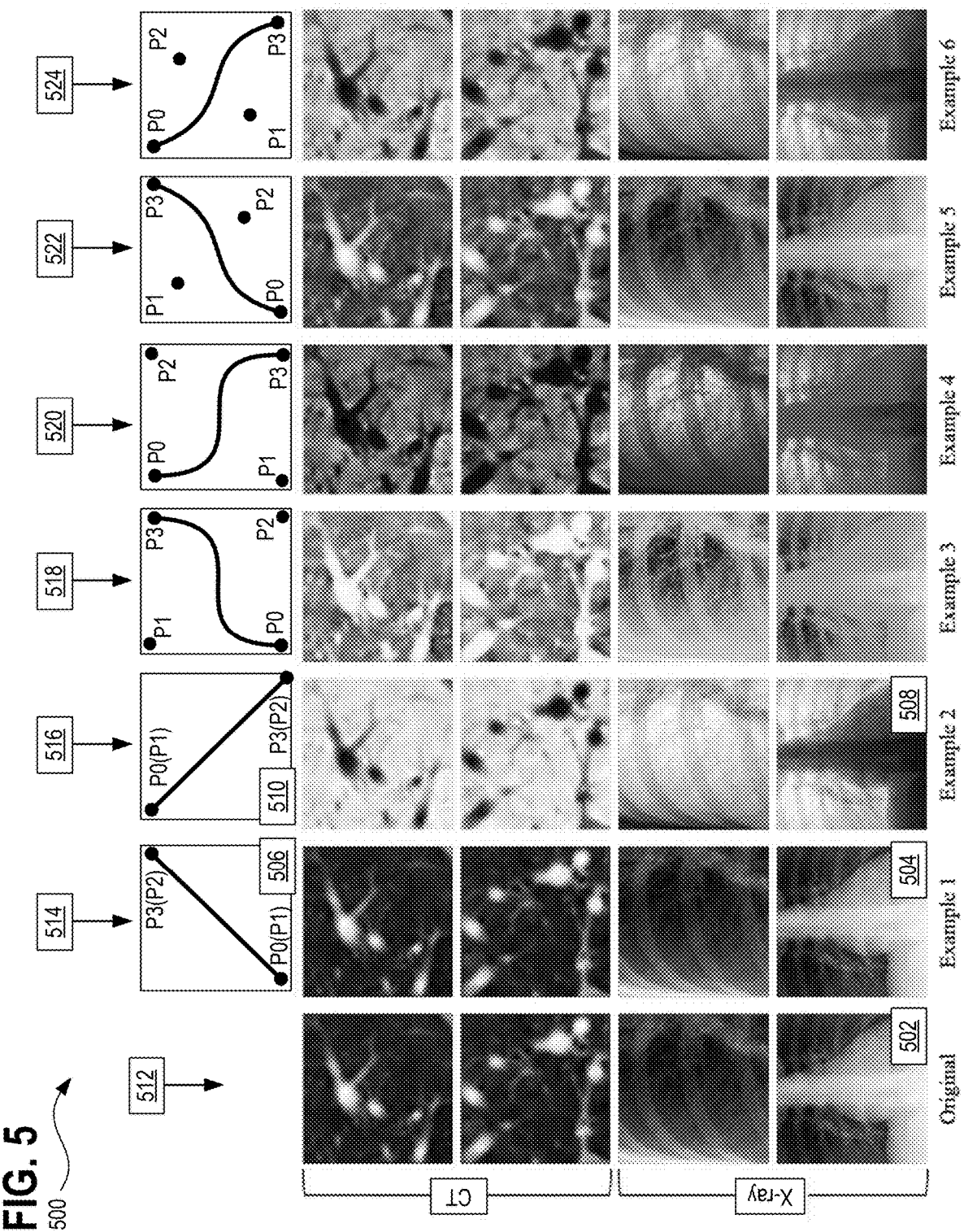
FIG. 5 depicts exemplary non-linear transformations in accordance with described embodiments.

FIG. 5 depicts exemplary non-linear transformations in accordance with described embodiments.

As shown here, the top two rows of images in FIG. 5 show a non-linear intensity transformation applied to CT images, and the bottom two rows of images in FIG. 5 show a non-linear intensity transformation applied to X-Ray images. Column 512 of FIG. 5 shows the original image, and columns 514-524 each show a non-linear intensity transformation applied to the corresponding original image using the Bezier curve function shown at the top of each column. For example, as shown in FIG. 5, an original patch 502 can be transformed to a transformed patch 504 using a transformation function 506, and original patch 502 can be transformed to a transformed patch 508 using a transformation function 510. Note that, in instances in which $P_0=P_1$ and $P_2=P_3$, the Bezier Curve is a linear function (e.g., as shown in columns 514 and 516). Additionally, note that in instances in which $P_0=(0,0)$ and $P_3=(1,1)$, the Bezier Curve can be an increasing function (e.g., as shown in columns 514, 518, and 522). Conversely, in instances in which $P_0=(1,1)$ and $P_3=(0,0)$, the Bezier Curve can be a decreasing function (e.g., as shown in columns 516, 520, and 524). In some embodiments, the control points can be randomly generated for more variance.

Note that, in some embodiments, images can be pre-processed in any suitable manner prior to application of the non-linear intensity transformation. For example, in some embodiments, intensity values can be clipped to any suitable range. As a more particular example, in instances in which the images correspond to CT images, intensity values of the CT images (i.e., Hounsfield units) can be clipped to any suitable range (e.g., [−1000, 1000], and/or any other suitable range). As another example, in some embodiments, intensity values can be normalized to any suitable range (e.g., [0,1], and/or any other suitable range). In some embodiments, intensity values can be clipped prior to normalization. For example, in some embodiments, intensity values associated with CT images can be clipped prior to normalization. Conversely, in some embodiments, intensity values can be normalized without clipping the intensity values. For example, in some embodiments, X-Ray images can be normalized (e.g., to [0,1], and/or to any other suitable range) without intensity clipping.

According to certain embodiments, process 100 (refer again to FIG. 1) may apply a local pixel shuffling transformation to the patch. In some embodiments, a local pixel shuffling transformation can include sampling a random window from the patch and shuffling the order of pixels included in the random window to generate a transformed patch. In some embodiments, by learning to restore the original patch of the image during training, an encoder-decoder network can learn the shapes of objects as well as the relative layout of different parts of the objects included in the image. Note that, in some embodiments, the size of the random window may be utilized to determine the expected difficulty of the task of restoring the original patch. Additionally, in some embodiments, the random window can be limited in size by any suitable criteria (e.g., smaller than a receptive field of the model, small enough to prevent changing global content of the image by pixel shuffling, and/or any other size).

Figure 6:
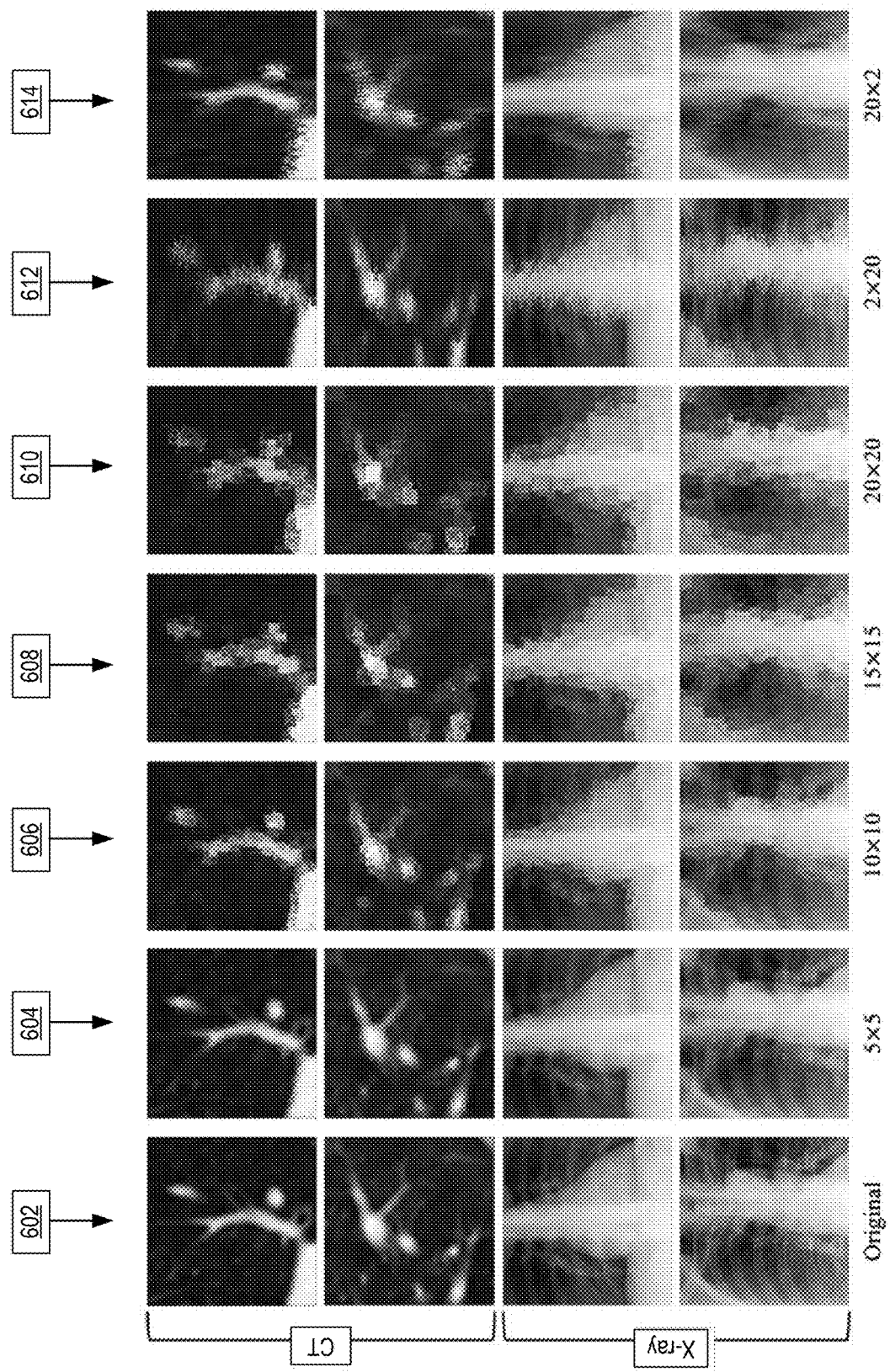
FIG. 6 depicts exemplary local pixel shuffling transformations in accordance with described embodiments.

FIG. 6 depicts exemplary local pixel shuffling transformations in accordance with described embodiments.

As shown here, the top two rows show patches from CT images and the bottom two rows show patches X-Ray images. Column 602 shows an original patch in each row, and, for each row, columns 604, 606, 608, 610, 612, and 614 show patches that are transformed based on the patch in column 602 using a local pixel shuffling transformation of using random windows of the size indicated at the bottom of each column.

In some embodiments, a local pixel shuffling transformation can be applied using any suitable technique(s). For example, in some embodiments, any suitable number of windows (e.g., one thousand, two thousand, and/or any other suitable number) of a particular size (e.g., 5 pixels×5 pixels, 10 pixels×10 pixels, 2 pixels×20 pixels, and/or any other suitable size) can be randomly selected from the patch. Note that, in some embodiments, a selected window is referred to as Wherein, with a size of m×n. In some embodiments, a transformed window can then be generated as: $\tilde{W} = P \times W \times P'$, where $\tilde{W}$ is the transformed window, and where P and P' denote permutation matrices of size m×m and n×n, respectively. Note that pre-multiplying W with P permutes the rows of window W, whereas post-multiplying W with P' results in the permutation of the columns of the window W.

Referring to the transformed patches generated using windows of different sizes as shown in FIG. 6, note that the window size can control a degree of distortion. For example, referring to column 604 of FIG. 6, when a 5 pixel×5 pixel window size is applied, shapes of the original patch are largely maintained. As another example, referring to column 610 of FIG. 6, when a 20 pixel×20 pixel window size is applied, the ribs of the original image are largely invisible. Additionally, note that various aspect ratios of windows impose more local variances in different directions. For example, referring to the X-Ray images (bottom two rows of FIG. 6), a window size with a height less than the width (e.g., column 612 of FIG. 6) distorts the boundary of the spine while preserving the overall presence of the ribs. Conversely, using a window size with a height greater than the width (e.g., column 614 of FIG. 6), the ribs are hardly visible, but the width of the spine and heart are generally unchanged. Note that, because local pixel shuffling to an extent keeps objects within the image as generally perceivable, a neural network trained using transformed patches using a local pixel shuffling transformation can learn invariant visual representations by restoring the original patches. Additionally, note that in certain embodiments, unlike denoising and in-painting (described below in more detail), a local pixel shuffling transformation as described herein does not replace pixel values with noise, thereby preserving identical global distributions to the original patch.

According to certain embodiments, process 100 (refer again to FIG. 1) may apply an out-painting transformation to the patch at 108. In some embodiments, by training an encoder-decoder network on a patch that has been transformed using an out-painting transformation, the encoder-decoder network can learn global geometry and spatial layout of organs in medical images.

Figure 7:
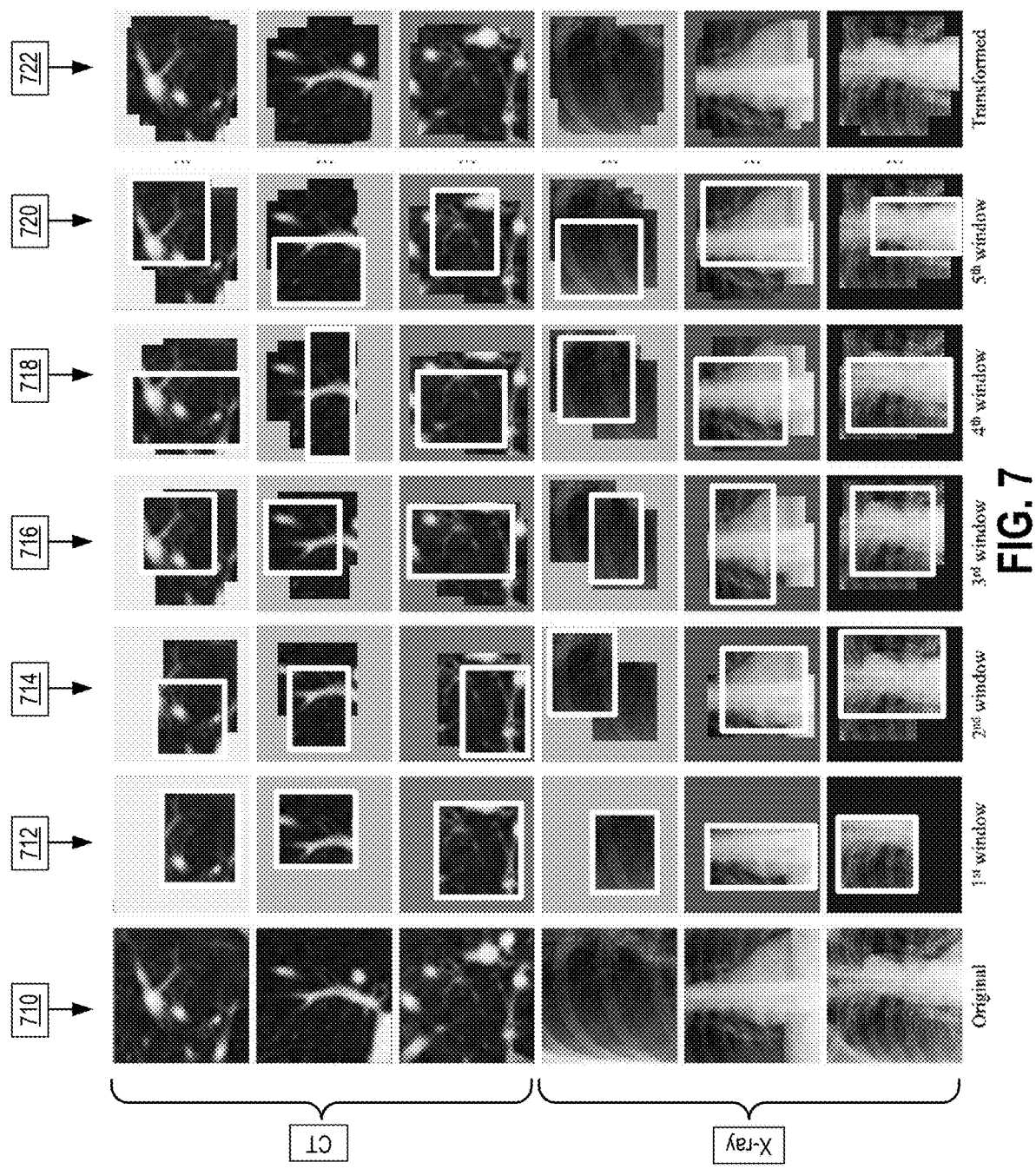
FIG. 7 depicts exemplary out-painting transformations in accordance with described embodiments.

FIG. 7 depicts exemplary out-painting transformations in accordance with described embodiments.

As shown here, the top three rows show patches taken from CT images, and the bottom three rows show patches taken from X-Ray images. Column 710 shows the original patch, and column 722 shows the transformed patch that was transformed using an out-painting transformation.

In some embodiments, a transformed patch can be generated from an original patch using an out-painting transformation in any suitable manner. For example, referring to FIG. 7, multiple windows, such as a first window 704 and a second window 706 can be selected from an original patch 702. Note that, in some embodiments, each window can be of any suitable size, a size of each window can be different, and windows can have different aspect ratios. Additionally, note that in some embodiments, a size of a window can be restricted to any suitable size relative to a size of original patch 702. In some embodiments, each window can be selected in any suitable manner. For example, in some embodiments, a center point within original patch 702 can be identified at random, and a window of an arbitrary size can be drawn around the identified center point. In some such embodiments, original patch 702 can then be cropped using the identified window. In some embodiments, each selected window can then be superimposed and merged to generate a transformed patch 708. Note that, although FIG. 7 shows a superposition of five windows, in some embodiments, an arbitrary number of windows can be chosen (e.g., five windows, ten windows, and/or any other suitable number). In some embodiments, a region inside the superimposed windows can be left exposed, and a surrounding region can be masked in any suitable manner (e.g., using a random number for a pixel intensity, and/or masked in any other suitable manner), as shown in the transformed patch 708. Note that, in some embodiments, windows can be selected such that a masked region is limited to any suitable portion of original patch 702 (e.g., less than 25% of original patch 702, less than 30% of original patch 702, and/or any other suitable size).

According to certain embodiments, process 100 (refer again to FIG. 1) may apply an in-painting transformation to the patch at 108.

In some embodiments, by training an encoder-decoder network on a patch that has been transformed using an in-painting transformation, the encoder-decoder network can learn local shape and texture of organs in medical images via interpolation.

Figure 8:
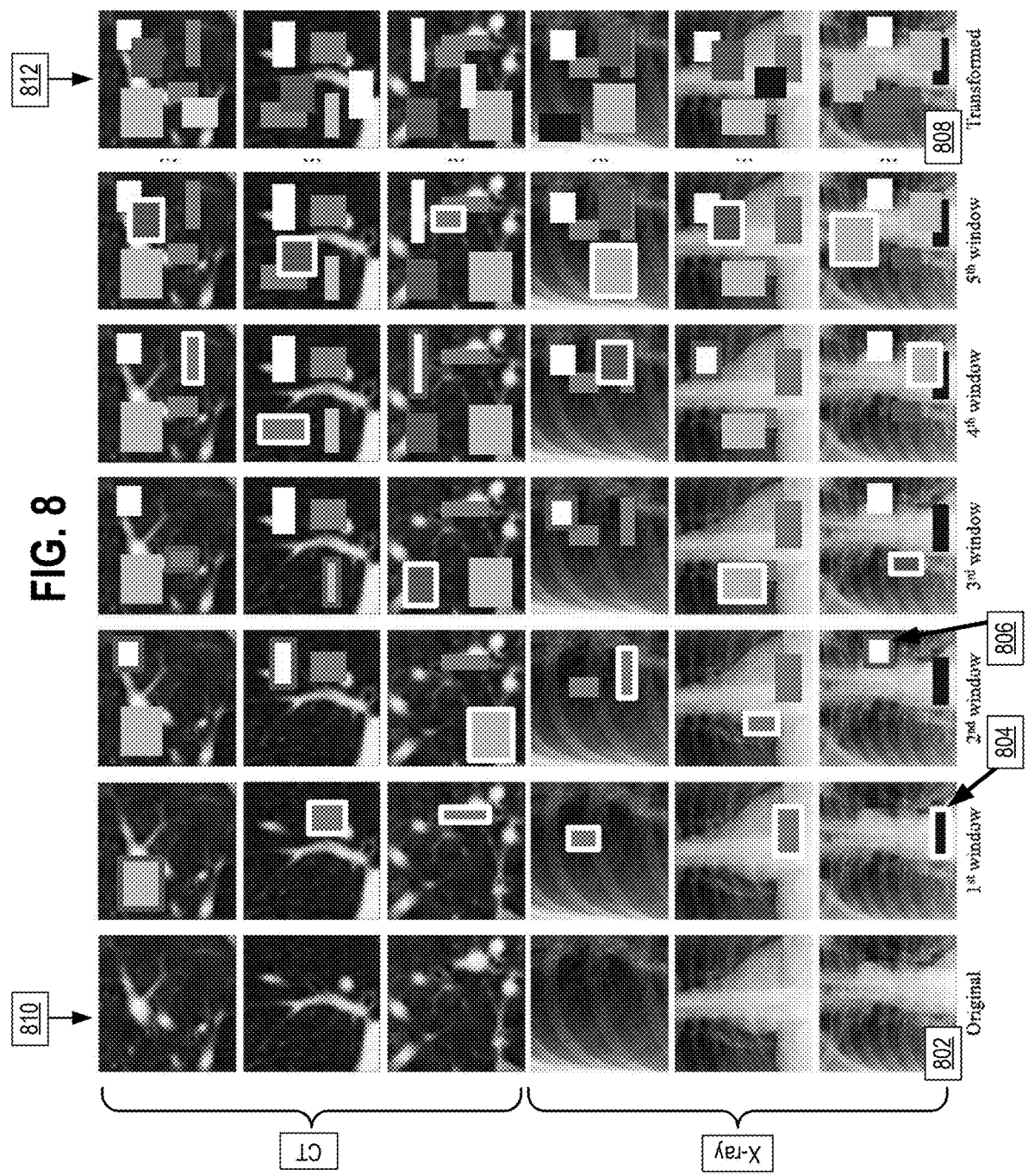
FIG. 8 depicts exemplary in-painting transformations in accordance with described embodiments.

FIG. 8 depicts exemplary in-painting transformations in accordance with described embodiments;

As shown here, the top three rows show patches taken from CT images, and the bottom three rows show patches taken from X-Ray images. Column 810 shows the original patch, and column 812 shows the transformed patch that was transformed using an in-painting transformation.

In some embodiments, a transformed patch can be generated from an original patch using an in-painting transformation in any suitable manner. For example, referring to FIG. 8, multiple windows, such as a first window 804 and a second window 806 can be selected from an original patch 802. Note that, in some embodiments, each window can be of any suitable size, a size of each window can be different, and windows can have different aspect ratios. Additionally, note that in some embodiments, a size of a window can be restricted to any suitable size relative to a size of original patch 802. In some embodiments, each window can be selected in any suitable manner. For example, in some embodiments, a center point within original patch 802 can be identified at random, and a window of an arbitrary size can be drawn around the identified center point. In some embodiments, a selected window can then be filled with a random number and superimposed on original patch 802, as shown in FIG. 8. In some embodiments, transformed patch 808 can be generated by iteratively superimposing any suitable number of windows (e.g., five windows, ten windows, and/or any other suitable number of windows), as shown in FIG. 8. Note that, although FIG. 8 shows a superposition of five windows, in some embodiments, an arbitrary number of windows can be chosen. Note that, in some embodiments, windows can be selected such that each window is less than a predetermined size (e.g., less than 25% of original patch 802, less than 30% of original patch 802, and/or any other suitable size).

According to certain embodiments, process 100, after block 108 of FIG. 1, may loop back and iterate by returning to block 104 of FIG. 1, so as to identify a second patch for the training sample, such as a different cropped region of the image corresponding to the training sample.

In some such embodiments, any suitable number of patches can be generated for a particular training sample. In some embodiments, process 100 can loop through blocks 104-108 until one or more patches have been generated for each image included in the group of training samples.

Note that, although transformation of patches has been shown in and described above in connection with FIGS. 5-8 using 2D images, in some embodiments, the transformations described can be applied to 3D images in any suitable manner. For example, in some embodiments, a transformation can be applied to a 3D image as a whole (e.g., rather than applying transformations to 2D slices of the 3D image). As a more particular example, in some embodiments, a local pixel shuffling transformation can be applied to a patch of a 3D image by shuffling pixels across any of the three dimensions. As another more particular example, in some embodiments, windows selected for either an in-painting or out-painting transformation can be three-dimensional windows. Note that, in some such embodiments, a patch of a 3D image can also be 3D.

Figure 9:
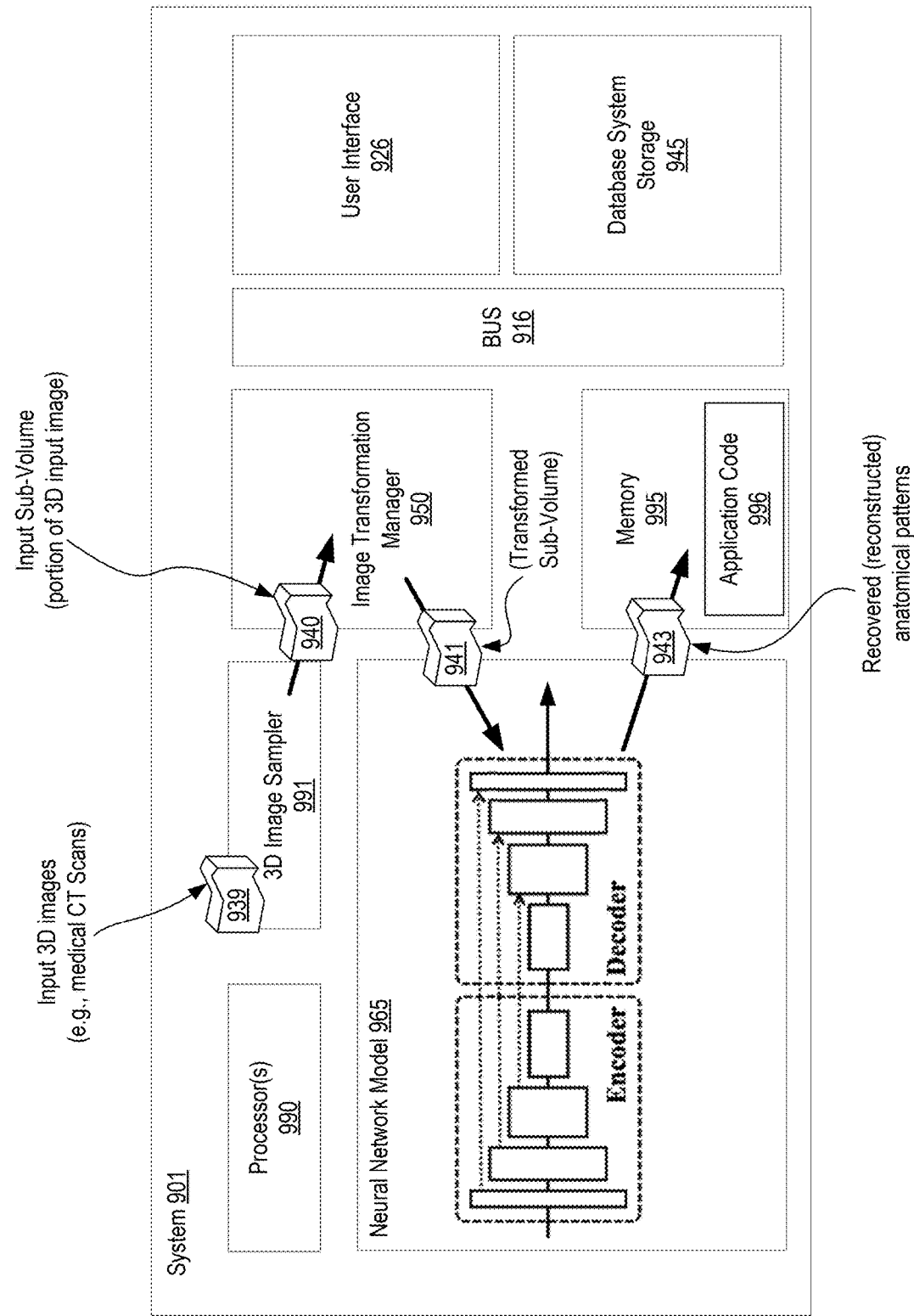
FIG. 9 shows a diagrammatic representation of a system within which embodiments may operate, be installed, integrated, or configured.

FIG. 9 shows a diagrammatic representation of a system 901 within which embodiments may operate, be installed, integrated, or configured. In accordance with one embodiment, there is a system 901 having at least a processor 990 and a memory 995 therein to execute implementing application code 996. Such a system 901 may communicatively interface with and cooperatively execute with the benefit of remote systems, such as a user device sending instructions and data, a user device to receive pre-trained source model as output from the system 901, or systems within a networked or within a client-server environment, etc.

According to the depicted embodiment, the system 901, includes the processor 990 and the memory 995 to execute instructions at the system 901. The system 901 as depicted here is specifically customized and configured to learn general-purpose image representations by recovering original sub-volumes 943 of 3D input images 939 from transformed 3D images 941. According to a particular embodiment, system 901 is further configured to execute instructions via the processor for identifying a group of training samples, wherein each training sample in the group of training samples includes an image and further in which, for each training sample in the group of training samples, the system 901 operates to identify an original patch of the image corresponding to the training sample; identify one or more transformations to be applied to the original patch; generate a transformed patch by applying the one or more transformations to the identified patch; and train an encoder-decoder network using a group of transformed patches corresponding to the group of training samples, wherein the encoder-decoder network is trained to generate an approximation of the original patch from a corresponding transformed patch, and wherein the encoder-decoder network is trained to minimize a loss function that indicates a difference between the generated approximation of the original patch and the original patch.

For example, the neural network model (NNM) 965 may apply its encoder and decoder to generate a pre-trained 3D model as a source model for subsequent transfer learning which may then be utilized as an application specific model for 3D medical image analysis.

The model output manager 985 may further transmit output back to a user device or other requestor, for example, via the user interface 926, including sending a disease classification 943 output to a user device or other requestor, or such information may alternatively be stored within the database system storage 945 of the system 901.

According to another embodiment of the system 901, a user interface 926 communicably interfaces with a user client device remote from the system and communicatively interfaces with the system via a public Internet.

Bus 916 interfaces the various components of the system 901 amongst each other, with any other peripheral(s) of the system 901, and with external components such as external network elements, other machines, client devices, cloud computing services, etc. Communications may further include communicating with external devices via a network interface over a LAN, WAN, or the public Internet.

FIG. 10 illustrates a diagrammatic representation of a machine 1001 in the exemplary form of a computer system, in accordance with one embodiment, within which a set of instructions, for causing the machine/computer system 1001 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1001 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1018 (e.g., a persistent storage device including hard disk drives and a persistent database and/or a multi-tenant database implementation), which communicate with each other via a bus 1030. Main memory 1004 includes an encoder-decoder 1024 (e.g., such as an encoder-decoder implemented via a neural network model) for performing self-learning operations on transformed 3D image sub-volumes, such as the sub-volumes of an image modified and transformed by the sub-volume transformation manager 1023, so as to pre-train and provide a source model 1025 for use with processing medical imaging in support of the methodologies and techniques described herein. Main memory 1004 and its sub-elements are further operable in conjunction with processing logic 1026 and processor 1002 to perform the methodologies discussed herein.

Processor 1002 represents one or more specialized and specifically configured processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application-specific integrated circuit (ASIC), a field programmable gate array (FPGA), a digital signal processor (DSP), network processor, or the like. Processor 1002 is configured to execute the processing logic 1026 for performing the operations and functionality which is discussed herein.

The computer system 1001 may further include a network interface card 1008. The computer system 1001 also may include a user interface 1010 (such as a video display unit, a liquid crystal display, etc.), an alphanumeric input device 1012 (e.g., a keyboard), a cursor control device 1013 (e.g., a mouse), and a signal generation device 1016 (e.g., an integrated speaker). The computer system 1001 may further include peripheral device 1036 (e.g., wireless or wired communication devices, memory devices, storage devices, audio processing devices, video processing devices, etc.).

The secondary memory 1018 may include a non-transitory machine-readable storage medium or a non-transitory computer readable storage medium or a non-transitory machine-accessible storage medium 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1001, the main memory 1004 and the processor 1002 also constituting machine-readable storage media. The software 1022 may further be transmitted or received over a network 1020 via the network interface card 1008.

FIG. 11A depicts a flow diagram illustrating a method 1100 for performing image segmentation using trained encoder-decoder networks, in accordance with the described embodiments.

FIG. 11B depicts a flow diagram illustrating a method 1101 for performing object detection, in accordance with the described embodiments.

FIG. 11C depicts a flow diagram illustrating a method 1102 for performing false positive reductions using trained encoder-decoder networks, in accordance with the described embodiments.

Methods 1100, 1101, and 1102 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 901 (see FIG. 9) and the machine 1001 (see FIG. 10) and the other supporting systems and components as described herein (such as the network depicted at FIG. 2 and supporting network and computing hardware at FIGS. 3 and 4) may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference first to the method 1100 at block 1105 as depicted at FIG. 11A, there is a method performed by a system specially configured to perform image segmentation using trained encoder-decoder networks, by performing the following operations:

At block 1110, processing logic initializes a neural network that includes a pre-trained encoder-decoder network and a plurality of randomly initialized classification layers appended to the decoder network of the pre-trained encoder-decoder network, wherein the pre-trained encoder-decoder network has been trained to generate an approximation of an input image that has been transformed using one or more image transformations.

At block 1115, processing logic identifies a group of training samples, wherein each training sample in the group of training samples includes an image.

At block 1120, processing logic performs, for each training sample in the group of training samples, the following sub-operations: at block 1121, applying operations associated with each layer of the pre-trained encoder network and the pre-trained decoder network to the image associated with the training sample; at block 1122, determining a probability that each pixel of the image associated with the training sample corresponds to a particular image class using the plurality of classification layers; at block 1123, calculating a segmentation error by comparing the probability that each pixel corresponds to a particular image class with ground truth values associated with the training sample.

At block 1115, processing logic updates weights associated with the encoder network, the decoder network, and the plurality of classification layers to minimize the segmentation error.

With reference next to the method 1101 at block 1130 as depicted at FIG. 11B, there is a method performed by a system specially configured to perform object detection, by performing the following operations:

At block 1135, processing logic initializes a neural network by appending a feature extraction backbone of a detection network to an encoder network of a pre-trained encoder-decoder network, wherein the pre-trained encoder-decoder network has been trained to generate an approximation of an input image that has been transformed using one or more image transformations.

At block 1140, processing logic identifies a group of training samples, wherein each training sample in the group of training samples includes an image.

At block 1145, processing logic performs, for each training sample in the group of training samples, the following sub-operations: at block 1146, applying operations associated with each layer of the encoder network and the feature extraction backbone to the image corresponding to the training sample; at block 1147, identifying one or more bounding boxes corresponding to the image associated with the training sample, at block 1148, calculating a probability that a region inside each of the one or more bounding boxes includes a target object, and at block 1149, calculating a detection error by comparing the probabilities associated with each region with ground truth values associated with the training sample.

At block 1150, processing logic updates weights associated with the detection network to minimize the detection error.

With reference next to the method 1102 at block 1160 as depicted at FIG. 11C, there is a method performed by a system specially configured to perform false positive reductions using trained encoder-decoder networks, by performing the following operations:

At block 1165, processing logic initializes a neural network that includes an encoder network of a pre-trained encoder-decoder network and a plurality of randomly initialized classification layers appended to the encoder network, wherein the pre-trained encoder-decoder network has been trained to generate an approximation of an input image that has been transformed using one or more image transformations.

At block 1170, processing logic identifies a group of training samples, wherein each training sample in the group of training samples includes an image.

At block 1175, processing logic performs, for each training sample in the group of training samples, the following sub-operations: at block 1176, applying operations associated with each layer of the pre-trained encoder network and the plurality of classification layers to the image associated with the training sample, at block 1177, determining a probability that the training sample has been assigned a label of positive for a medical condition and that the assigned label is a false positive based on the plurality of classification layers, and at block 1178, calculating a prediction error by comparing the determined probability with a ground truth label associated with the training sample.

At block 1180, processing logic updates weights associated with the encoder network and the plurality of classification layers to minimize the prediction error.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
a memory to store instructions;
a set of one or more processors to execute the instructions stored in the memory to:
identify a group of unlabeled and unannotated training samples, wherein each unlabeled and unannotated training sample includes a medical image of a selected anatomical region of a body of a patient;
for each unlabeled and unannotated training sample in the group of unlabeled and unannotated training samples:
identify a patch that is a portion of the medial image corresponding to the unlabeled and unannotated training sample;
identify one or more transformations to be applied to the patch; and
generate a transformed patch by applying the one or more transformations to the patch; and
train a source model comprising an encoder-decoder network to learn anatomical patterns from the medical images of the selected anatomical region in a self-supervised manner using a group of transformed patches corresponding to the group of unlabeled and unannotated training samples, and without using labeled or annotated training samples, wherein the encoder-decoder network is trained to generate an approximation of the patch from a corresponding transformed patch, and wherein the encoder-decoder network is trained to minimize a loss function that indicates a difference between the generated approximation of the patch and the patch.

2. The system of claim 1, wherein each medical image is a three-dimensional medical image.

3. The system of claim 1, wherein the one or more transformations include changing an intensity value of each pixel in the patch.

4. The system of claim 1, wherein the one or more transformations include for each pixel in the patch, changing a location of the pixel from a first location to a second location.

5. The system of claim 1, wherein the one or more transformations include masking one or more portions of the patch.

6. The system of claim 1, wherein identifying the one or more transformations to be applied to the patch comprises:
identifying a group of candidate transformations, wherein each transformation in the group of candidate transformations is associated with a probability that the transformation will be selected as one of the one or more transformations to be applied to the patch; and
selecting the one or more transformations based on the probability associated with each transformation in the group of candidate transformations.

7. The system of claim 1, wherein the set of one or more processors further to execute instructions stored in the memory to:

train, using the trained source model, the application-specific target model to perform the task relating to the medical image of the selected anatomical region.

8. The system of claim 7, wherein the set of one or more processors further to execute instructions stored in the memory to train, using the trained source model, the application-specific target model to perform the task relating to the medical image of the selected anatomical region, comprises instructions to identify portions of the medical image of the anatomical region that include a tumor or lesion or classify a medical image of the anatomical region as associated with one of a healthy-and a particular disease-state.

9. A non-transitory computer-readable medium containing computer executable instructions that, when executed by a processor, cause the processor to perform a method comprising:

identifying a group of unlabeled and unannotated training samples, wherein each unlabeled and unannotated training sample includes a medical image of a selected anatomical region;

for each unlabeled and unannotated training sample in the group of unlabeled and unannotated training samples:
identifying a patch that is a portion of the medical image corresponding to the unlabeled and unannotated training sample;
identifying one or more transformations to be applied to the patch; and
generating a transformed patch by applying the one or more transformations to the patch; and
training a source model comprising an encoder-decoder network to learn anatomical patterns from the medical images of the selected anatomical region in a self-supervised manner using a group of transformed patches corresponding to the group of unlabeled and unannotated training samples, and without using labeled or annotated training samples, wherein the encoder-decoder network is trained to generate an approximation of the patch from a corresponding transformed patch, and wherein the encoder-decoder network is trained to minimize a loss function that indicates a difference between the generated approximation of the patch and the patch.

10. The non-transitory computer-readable medium of claim 9, wherein each medical image is a three-dimensional medical image.

11. The non-transitory computer-readable medium of claim 9, wherein the one or more transformations include changing an intensity value of each pixel in the patch.

12. The non-transitory computer-readable medium of claim 9, wherein the one or more transformations include for each pixel in the patch, changing a location of the pixel from a first location to a second location.

13. The non-transitory computer-readable medium of claim 9, wherein the one or more transformations include masking one or more portions of the patch.

14. The non-transitory computer-readable medium of claim 9, wherein identifying the one or more transformations to be applied to the patch comprises:

identifying a group of candidate transformations, wherein each transformation in the group of candidate transformations is associated with a probability that the transformation will be selected as one of the one or more transformations to be applied to the patch; and
selecting the one or more transformations based on the probability associated with each transformation in the group of candidate transformations.

15. A method for performing object detection, comprising:

initializing a neural network by appending a feature extraction backbone of a detection network to an encoder network of a pre-trained encoder-decoder network, wherein the pre-trained encoder-decoder network has been trained to generate an approximation of an input image that has been transformed using one or more image transformations;

identifying a group of unlabeled and unannotated training samples, wherein each unlabeled and unannotated training sample includes an image;

for each unlabeled and unannotated training sample in the group of unlabeled and unannotated training samples:
applying operations associated with each layer of the encoder network and the feature extraction backbone to the image corresponding to the unlabeled and unannotated training sample;
identifying one or more bounding boxes corresponding to the image associated with the unlabeled and unannotated training sample;
calculating a probability that a region inside each of the one or more bounding boxes includes a target object; and
calculating a detection error by comparing the probabilities associated with each region with ground truth values associated with the unlabeled and unannotated training sample; and
updating weights associated with the detection network to minimize the detection error.

16. The method of claim 15, further comprising:
identifying a patch that is a portion of the image corresponding to the unlabeled and unannotated training sample;
identifying one or more transformations to be applied to the patch;
generating a transformed patch by applying the one or more transformations to the patch; and
training an encoder-decoder network to learn patterns from the images in a self-supervised manner using a group of transformed patches corresponding to the group of unlabeled and unannotated training samples, and without using labeled or annotated training samples, wherein the encoder-decoder network is trained to generate an approximation of the patch from a corresponding transformed patch, and wherein the encoder-decoder network is trained to minimize a loss function that indicates a difference between the generated approximation of the patch and the patch.

17. The method of claim 16, wherein each image is a three-dimensional image.

18. The method of claim 16, wherein the one or more transformations include changing an intensity value of each pixel in the patch.

19. The method of claim 16, wherein the one or more transformations include for each pixel in the patch, changing a location of the pixel from a first location to a second location.

20. The method of claim 16, wherein the one or more transformations include masking one or more portions of the patch.

21. The method of claim 16, wherein identifying the one or more transformations to be applied to the patch comprises:

identifying a group of candidate transformations, wherein each transformation in the group of candidate transformations is associated with a probability that the transformation will be selected as one of the one or more transformations to be applied to the patch; and selecting the one or more transformations based on the probability associated with each transformation in the group of candidate transformations.

\* \* \* \* \*